United States Patent
Aisen et al.

(10) Patent No.: US 11,823,269 B2
(45) Date of Patent: *Nov. 21, 2023

(54) SYNCHRONIZED PROCESSING OF DATA BY NETWORKED COMPUTING RESOURCES

(71) Applicant: ROYAL BANK OF CANADA, Toronto (CA)

(72) Inventors: Daniel Aisen, New York, NY (US); Bradley Katsuyama, New York, NY (US); Robert Park, New York, NY (US); John Schwall, New York, NY (US); Richard Steiner, Wyckoff, NJ (US); Allen Zhang, Princeton, NJ (US); Thomas L. Popejoy, New York, NY (US)

(73) Assignee: ROYAL BANK OF CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,234

(22) Filed: Apr. 12, 2022

(65) Prior Publication Data

US 2022/0292601 A1 Sep. 15, 2022

Related U.S. Application Data

(63) Continuation of application No. 16/880,537, filed on May 21, 2020, now Pat. No. 11,308,554, which is a
(Continued)

(51) Int. Cl.
*H04L 67/62* (2022.01)
*G06Q 40/04* (2012.01)
(Continued)

(52) U.S. Cl.
CPC ......... *G06Q 40/04* (2013.01); *H04L 67/1095* (2013.01); *H04L 67/62* (2022.05); *H04L 45/22* (2013.01)

(58) Field of Classification Search
CPC ..... G06Q 40/04; H04L 67/62; H04L 67/1095; H04L 45/22
(Continued)

(56) References Cited

U.S. PATENT DOCUMENTS 5,179,702 A 1/1993 Spix et al.
5,191,578 A * 3/1993 Lee ...................... H04L 49/508
370/418

(Continued)

FOREIGN PATENT DOCUMENTS

CN 1615472 A 5/2005
CN 101256660 A 9/2008
(Continued)

OTHER PUBLICATIONS

United States Patent and Trademark Office, Office Action issued in U.S. Appl. No. 16/896,602, dated Jun. 25, 2021.
(Continued)

*Primary Examiner* — Thu Ha T Nguyen
(74) *Attorney, Agent, or Firm* — Norton Rose Fulbright Canada LLP

(57) ABSTRACT

Systems 100, 1000, methods, and machine-interpretable programming or other instruction products for the management of data transmission by multiple networked computing resources 106, 1106. In particular, the disclosure relates to the synchronization of related requests for transmitting data using distributed network resources.

20 Claims, 8 Drawing Sheets

Related U.S. Application Data continuation of application No. 15/908,543, filed on Feb. 28, 2018, now Pat. No. 10,664,912, which is a continuation of application No. 14/565,043, filed on Dec. 9, 2014, now Pat. No. 9,940,670, which is a continuation-in-part of application No. 13/941,513, filed on Jul. 14, 2013, now Pat. No. 8,984,137, and a continuation-in-part of application No. 12/796,139, filed on Jun. 8, 2010, now Pat. No. 10,650,450, said application No. 13/941,513 is a continuation of application No. 12/796,139, filed on Jun. 8, 2010, now Pat. No. 10,650,450.

(60) Provisional application No. 61/285,375, filed on Dec. 10, 2009.

(51) Int. Cl.
*H04L 67/1095* (2022.01)
*H04L 45/00* (2022.01)

(58) Field of Classification Search
USPC .......................... 705/37; 709/201, 232, 233
See application file for complete search history.

(56) References Cited

U.S. PATENT DOCUMENTS

| | | | |
|---|---|---|---|
| 5,339,415 A | 8/1994 | Strout, II et al. | |
| 5,701,495 A | 12/1997 | Arndt et al. | |
| 5,787,272 A | 7/1998 | Gupta et al. | |
| 5,820,463 A | 10/1998 | O'Callaghan | |
| 5,887,143 A | 3/1999 | Saito et al. | |
| 5,896,523 A | 4/1999 | Bissett et al. | |
| 5,953,708 A | 9/1999 | Midorikawa et al. | |
| 6,081,906 A | 6/2000 | Nishizawa et al. | |
| 6,182,124 B1* | 1/2001 | Lau | H04L 9/40 |
| | | | 709/227 |
| 6,295,276 B1 | 9/2001 | Datta et al. | |
| 6,377,993 B1 | 4/2002 | Brandt et al. | |
| 6,425,017 B1* | 7/2002 | Dievendorff | G06F 9/547 |
| | | | 719/315 |
| 6,434,590 B1 | 8/2002 | Blelloch et al. | |
| 6,493,341 B1 | 12/2002 | Datta et al. | |
| 6,578,068 B1 | 6/2003 | Bowman-Amuah | |
| 6,618,707 B1 | 9/2003 | Gary | |
| 6,675,191 B1 | 1/2004 | Ito | |
| 6,677,858 B1 | 1/2004 | Faris et al. | |
| 6,721,765 B2 | 4/2004 | Ghosh et al. | |
| 6,742,044 B1 | 5/2004 | Aviani et al. | |
| 6,772,193 B1 | 8/2004 | Igawa et al. | |
| 6,789,125 B1 | 9/2004 | Aviani et al. | |
| 6,809,733 B2 | 10/2004 | Mukherjee et al. | |
| 6,856,970 B1 | 2/2005 | Campbell et al. | |
| 6,871,341 B1 | 3/2005 | Shyr | |
| 7,114,171 B2 | 9/2006 | Brady, Jr. et al. | |
| 7,123,608 B1* | 10/2006 | Scott | H04L 67/30 |
| | | | 370/353 |
| 7,143,392 B2 | 11/2006 | Li et al. | |
| 7,171,479 B2 | 1/2007 | Buchanan et al. | |
| 7,210,863 B2 | 5/2007 | Nakamura | |
| 7,219,158 B2 | 5/2007 | Border et al. | |
| 7,277,861 B1 | 10/2007 | Benson et al. | |
| 7,281,250 B2 | 10/2007 | Ohsawa et al. | |
| 7,290,168 B1 | 10/2007 | DeKoning | |
| 7,296,133 B2* | 11/2007 | Swanberg | G06F 9/5077 |
| | | | 711/173 |
| 7,318,083 B2 | 1/2008 | Senda | |
| 7,356,487 B2* | 4/2008 | Kitze | G06Q 40/04 |
| | | | 713/153 |
| 7,392,218 B2 | 6/2008 | Saliba | |
| 7,401,129 B2 | 7/2008 | Negishi et al. | |
| 7,401,159 B1 | 7/2008 | Aviani et al. | |
| 7,406,688 B2 | 7/2008 | Shibayama et al. | |
| 7,447,775 B1 | 11/2008 | Zhu et al. | |
| 7,454,457 B1 | 11/2008 | Lowery et al. | |
| 7,457,279 B1* | 11/2008 | Scott | H04L 65/1043 |
| | | | 709/219 |
| 7,487,125 B2 | 2/2009 | Littlewood | |
| 7,502,912 B2 | 3/2009 | Sodani et al. | |
| 7,552,445 B2 | 6/2009 | Green | |
| 7,617,159 B1 | 11/2009 | Donner | |
| 7,617,274 B2 | 11/2009 | Coughlin et al. | |
| 7,627,658 B2 | 12/2009 | Levett et al. | |
| 7,630,986 B1 | 12/2009 | Herz et al. | |
| 7,634,477 B2* | 12/2009 | Hinshaw | G06F 16/2455 |
| 7,657,890 B2 | 2/2010 | Kanai et al. | |
| 7,676,570 B2 | 3/2010 | Levy et al. | |
| 7,693,873 B2 | 4/2010 | Nesbitt et al. | |
| 7,755,621 B2 | 7/2010 | Kripac | |
| 7,769,658 B2 | 8/2010 | Murtaugh et al. | |
| 7,778,896 B2 | 8/2010 | Levine | |
| 7,778,919 B2 | 8/2010 | Waelbroeck et al. | |
| 7,794,161 B2 | 9/2010 | Nakamura | |
| 7,818,236 B2 | 10/2010 | Hansen et al. | |
| 7,822,728 B1 | 10/2010 | Chandler et al. | |
| 7,840,481 B2 | 11/2010 | Aloe et al. | |
| 7,840,482 B2* | 11/2010 | Singla | G06Q 40/06 |
| | | | 705/37 |
| 7,844,726 B2* | 11/2010 | Foygel | H04L 67/303 |
| | | | 709/232 |
| 7,890,735 B2 | 2/2011 | Tran | |
| 7,912,779 B2 | 3/2011 | Saliba | |
| 7,970,891 B1 | 6/2011 | Kontothanssis et al. | |
| 7,979,344 B2 | 7/2011 | Kociuba | |
| 8,037,119 B1 | 10/2011 | Oberman et al. | |
| 8,055,577 B2 | 11/2011 | Saliba | |
| 8,069,138 B2 | 11/2011 | Tully et al. | |
| 8,082,206 B2 | 12/2011 | Troxel, Jr. et al. | |
| 8,103,769 B1 | 1/2012 | Weiser et al. | |
| 8,127,001 B1 | 2/2012 | Sylvain | |
| 8,140,423 B2 | 3/2012 | Hansen et al. | |
| 8,270,594 B2 | 9/2012 | Segall et al. | |
| 8,291,252 B2 | 10/2012 | Mattice et al. | |
| 8,301,790 B2 | 10/2012 | Morrison et al. | |
| 8,307,119 B2 | 11/2012 | Rochelle et al. | |
| 8,326,970 B2 | 12/2012 | Cherkasova et al. | |
| 8,336,051 B2 | 12/2012 | Gokulakannan | |
| 8,358,765 B1 | 1/2013 | Whitten et al. | |
| 8,359,595 B2 | 1/2013 | Kaler et al. | |
| 8,392,314 B1 | 3/2013 | Epstein et al. | |
| 8,407,122 B2 | 3/2013 | Parsons et al. | |
| 8,407,284 B2 | 3/2013 | Ferris | |
| 8,473,469 B1 | 6/2013 | Yancey et al. | |
| 8,484,661 B2 | 7/2013 | Walsh | |
| 8,504,667 B2* | 8/2013 | Howorka | G06Q 40/04 |
| | | | 709/223 |
| 8,527,440 B2 | 9/2013 | Hettel | |
| 8,578,052 B1 | 11/2013 | Liu et al. | |
| 8,645,498 B2* | 2/2014 | Youill | G06Q 40/12 |
| | | | 709/227 |
| 8,667,019 B2 | 3/2014 | Mehra et al. | |
| 8,682,777 B1 | 3/2014 | Epstein et al. | |
| 8,825,830 B2 | 9/2014 | Newton et al. | |
| 8,832,219 B2 | 9/2014 | Morgan | |
| 8,839,047 B2 | 9/2014 | Gyorffy | |
| 8,862,680 B2 | 10/2014 | Van Wyck Gould et al. | |
| 8,868,497 B2 | 10/2014 | Yan et al. | |
| 8,869,256 B2 | 10/2014 | Sample et al. | |
| 8,891,364 B2 | 11/2014 | Gopinath et al. | |
| 8,914,438 B2 | 12/2014 | Pletter et al. | |
| 8,949,414 B2 | 2/2015 | Raja et al. | |
| 9,032,373 B1 | 5/2015 | Gupta et al. | |
| 9,058,406 B2 | 6/2015 | Soroca et al. | |
| 9,208,032 B1 | 12/2015 | McAlister et al. | |
| 9,210,217 B2 | 12/2015 | Raleigh et al. | |
| 9,467,383 B2 | 10/2016 | Lin et al. | |
| 9,503,510 B2 | 11/2016 | Raleigh et al. | |
| 9,519,752 B2 | 12/2016 | Rooyen et al. | |
| 9,552,242 B1 | 1/2017 | Leshinsky et al. | |
| 9,552,582 B2 | 1/2017 | Subramanian et al. | |
| 9,633,051 B1 | 4/2017 | Maccanti et al. | |
| 9,729,675 B2 | 8/2017 | Luecke et al. | |
| 9,734,535 B2 | 8/2017 | Burns et al. | |

(56) References Cited

U.S. PATENT DOCUMENTS

| | | |
|---|---|---|
| 9,749,376 B2 | 8/2017 | Bologh |
| 9,755,951 B2* | 9/2017 | Loveless ............... G06Q 40/04 |
| 9,804,943 B2 | 10/2017 | Kraft et al. |
| 9,858,619 B2* | 1/2018 | Schmitt ................. G06Q 40/06 |
| 9,881,338 B2 | 1/2018 | Schmitt et al. |
| 9,971,713 B2 | 5/2018 | Asaad et al. |
| 9,979,589 B2* | 5/2018 | Iannaccone ......... H04L 43/0864 |
| 10,027,743 B2 | 7/2018 | Kawazoe et al. |
| 10,057,333 B2* | 8/2018 | Pitio ....................... H04L 67/10 |
| 10,305,786 B2* | 5/2019 | Aked ..................... G06Q 40/04 |
| 10,346,428 B2 | 7/2019 | Madhavan et al. |
| 10,567,500 B1* | 2/2020 | Leshinsky ........... H04L 67/1097 |
| 10,650,450 B2 | 5/2020 | Aisen et al. |
| 10,705,849 B2 | 7/2020 | Mirhosseininiri et al. |
| 10,838,926 B2 | 11/2020 | Bensberg et al. |
| 10,846,194 B1 | 11/2020 | Krebs et al. |
| 10,855,749 B2 | 12/2020 | Thurimella et al. |
| 10,992,585 B1 | 4/2021 | Gilman et al. |
| 11,108,681 B2* | 8/2021 | Snowdon ............... H04L 7/0033 |
| 11,159,449 B1* | 10/2021 | Nishimura ............. H04L 67/61 |
| 11,184,266 B1* | 11/2021 | Blum ................. H04L 43/0852 |
| 11,240,302 B1* | 2/2022 | Callau ................... G06F 3/0604 |
| 11,308,554 B2* | 4/2022 | Aisen ..................... H04L 67/02 |
| 11,600,045 B2* | 3/2023 | Stephens ................. F21S 4/10 |
| 2001/0051910 A1 | 12/2001 | Snelgrove et al. |
| 2002/0026321 A1 | 2/2002 | Faris et al. |
| 2003/0151619 A1 | 8/2003 | McBride |
| 2003/0177187 A1* | 9/2003 | Levine .................... H04L 67/52 709/205 |
| 2004/0025161 A1 | 2/2004 | Chauvel et al. |
| 2004/0030611 A1 | 2/2004 | Byrne |
| 2004/0085898 A1 | 5/2004 | Gass |
| 2004/0167840 A1 | 8/2004 | Tully et al. |
| 2004/0218609 A1* | 11/2004 | Foster ..................... H04L 63/14 370/401 |
| 2004/0268354 A1 | 12/2004 | Kanai et al. |
| 2005/0050386 A1 | 3/2005 | Reinhardt et al. |
| 2006/0047591 A1 | 3/2006 | Snouffer |
| 2006/0080389 A1 | 4/2006 | Powers et al. |
| 2006/0268934 A1 | 11/2006 | Shimizu et al. |
| 2007/0156786 A1 | 7/2007 | May et al. |
| 2007/0204137 A1 | 8/2007 | Tran |
| 2007/0226135 A1 | 9/2007 | Yamada et al. |
| 2007/0240160 A1 | 10/2007 | Paterson-Jones et al. |
| 2008/0127200 A1 | 5/2008 | Richards et al. |
| 2008/0294332 A1 | 11/2008 | Levanon et al. |
| 2009/0037313 A1 | 2/2009 | Tully et al. |
| 2009/0049443 A1 | 2/2009 | Powers et al. |
| 2009/0063675 A1 | 3/2009 | Faris et al. |
| 2009/0119729 A1 | 5/2009 | Periman et al. |
| 2009/0171950 A1 | 7/2009 | Lunenfeld |
| 2010/0050182 A1 | 2/2010 | Mintz et al. |
| 2010/0138688 A1 | 6/2010 | Sykes et al. |
| 2010/0332373 A1 | 12/2010 | Crabtree et al. |
| 2011/0231340 A1 | 9/2011 | Kociuba |
| 2011/0264577 A1 | 10/2011 | Winbom et al. |
| 2011/0295736 A1 | 12/2011 | Freer et al. |
| 2012/0036278 A1 | 2/2012 | Rafsky et al. |
| 2012/0089496 A1 | 4/2012 | Taylor et al. |
| 2012/0136986 A1 | 5/2012 | Nader |
| 2012/0159428 A1 | 6/2012 | Park et al. |
| 2012/0163797 A1* | 6/2012 | Wang ................. H04J 14/0267 398/2 |
| 2012/0221546 A1 | 8/2012 | Rafsky et al. |
| 2012/0243534 A1 | 9/2012 | Rafsky et al. |
| 2012/0246052 A1 | 9/2012 | Taylor et al. |
| 2012/0259846 A1 | 10/2012 | Rafsky et al. |
| 2012/0281840 A1 | 11/2012 | Rafsky et al. |
| 2013/0027561 A1 | 1/2013 | Lee et al. |
| 2013/0042156 A1 | 2/2013 | Srinivasan et al. |
| 2013/0159021 A1 | 6/2013 | Felsher |
| 2014/0189256 A1 | 7/2014 | Kranich et al. |
| 2015/0073967 A1 | 3/2015 | Katsuyama et al. |
| 2015/0127516 A1 | 5/2015 | Studnitzer et al. |
| 2015/0163379 A1 | 6/2015 | Herzog |
| 2015/0278333 A1 | 10/2015 | Hirose et al. |
| 2016/0028855 A1 | 1/2016 | Goyal et al. |
| 2016/0078537 A1 | 3/2016 | Katsuyama et al. |
| 2016/0127808 A1* | 5/2016 | Wong .................... H04M 15/08 379/112.04 |
| 2016/0150045 A1 | 5/2016 | Singer |
| 2016/0217526 A1 | 7/2016 | Decker |
| 2016/0225085 A1 | 8/2016 | Brookfield |
| 2017/0032038 A1 | 2/2017 | Relkin et al. |
| 2017/0063927 A1 | 3/2017 | Schultz et al. |
| 2017/0078160 A1 | 3/2017 | Hong et al. |
| 2017/0123929 A1 | 5/2017 | Helleren |
| 2017/0221149 A1 | 8/2017 | Hsu-Hoffman et al. |
| 2017/0235600 A1 | 8/2017 | Morosan et al. |
| 2017/0301019 A1 | 10/2017 | Burns et al. |
| 2018/0024997 A1 | 1/2018 | Hassan |
| 2018/0025016 A1 | 1/2018 | Hassan |
| 2018/0047100 A1 | 2/2018 | Bonig et al. |
| 2018/0270290 A1* | 9/2018 | Sinha .................. H04L 67/2871 |
| 2018/0302334 A1* | 10/2018 | Osterlund ............... H04L 43/50 |
| 2018/0350144 A1 | 12/2018 | Rathod |
| 2018/0357661 A1 | 12/2018 | Fadeev et al. |
| 2019/0007503 A1 | 1/2019 | Zmijewski et al. |
| 2019/0044836 A1 | 2/2019 | Kavanagh |
| 2019/0068512 A1 | 2/2019 | Papaloukopoulos et al. |
| 2019/0108247 A1* | 4/2019 | Kavanagh ........... G06F 11/3072 |
| 2019/0147526 A1 | 5/2019 | Mehta et al. |
| 2019/0149449 A1* | 5/2019 | Morris ..................... H04L 45/22 709/245 |
| 2019/0260824 A1* | 8/2019 | Pitio ....................... H04L 67/10 |
| 2019/0340109 A1 | 11/2019 | Barron-Kraus et al. |
| 2019/0347081 A1 | 11/2019 | Kavanagh et al. |
| 2019/0362154 A1 | 11/2019 | Moore et al. |
| 2019/0385700 A1 | 12/2019 | Jaimovich et al. |
| 2019/0386918 A1 | 12/2019 | Iyer et al. |
| 2020/0322283 A1* | 10/2020 | Osterlund ........... H04L 41/0668 |
| 2020/0389469 A1* | 12/2020 | Litichever ............. H04L 63/029 |
| 2021/0067463 A1* | 3/2021 | Mukhopadhyay .... H04L 49/251 |
| 2022/0245574 A1* | 8/2022 | Cella ....................... G06F 9/451 |
| 2023/0016946 A1* | 1/2023 | Wouhaybi ............... H04L 45/16 |
| 2023/0074706 A1* | 3/2023 | Xiao .................. G06V 30/1444 |
| 2023/0176557 A1* | 6/2023 | Cella .................. G05B 19/4184 700/117 |

FOREIGN PATENT DOCUMENTS

| | | |
|---|---|---|
| EP | 0602906 A1 | 6/1994 |
| EP | 2043287 A1 | 4/2009 |
| EP | 2510451 B1 | 6/2010 |
| EP | 3269090 B1 | 2/2016 |
| JP | H09101837 A | 4/1997 |
| JP | 2003062350 A | 3/2003 |
| JP | 2007241394 A | 9/2007 |
| JP | 2008538027 A | 10/2008 |
| KR | 20100077151 A | 7/2010 |
| WO | 2008088946 A1 | 7/2008 |
| WO | 2008154306 A1 | 12/2008 |
| WO | 2009073023 A1 | 6/2009 |
| WO | 2011069234 A1 | 6/2011 |
| WO | 2012008915 A1 | 1/2012 |
| WO | 2016135705 A1 | 9/2016 |

OTHER PUBLICATIONS

Canadian Intellectual Property Office, Examiner's Report dated Feb. 11, 2022 for Canadian Application No. 2,922,072.
"A Solution to Predatory High Frequency Trading?", dated Jan. 19, 2011, http://seekingalpha.com.
"RBC Capital's THOR Smacks Down HFTs", dated Jan. 19, 2011, http://tradersnarrative.wordpress.com.
The Cyborg Trader, "Thor Kills Latency Arbitrage", dated Jan. 21, 2011, http://cyborgtrading.blogspot.ca.
Narang, M. et al., "Bloomberg high Frequency Trading", dated Apr. 10, 2012, http://www.bloomberglink.com.
Granger, A., "Smart Order Routing Debated as HFT Foil", The Wall Street Journal Letter, dated Apr. 29, 2011.

(56) References Cited

OTHER PUBLICATIONS

FTSE Global Markets, "Avoiding Latency Arbitrage", The 2011 Trading Guide.
"The Paradox of a New Paradigm", US Institutional Equity Trading 2012/13, dated Oct. 2012.
"When the Speed of Light is Too Slow: Trading at the Edge", dated Nov. 11, 2010, http://kurzweillai.net.
Kay, R., "Pragmatic Network Latency Engineering Fundamental Facts and Analysis", cPacket Networks, claimed copyright 2009.
Connelly et al., "FM-QoS: Real-Time Communication Using Self-Synchronizing Schedules"ACM/IEEE 1997 Conference on Supercomputing, dated Nov. 1997.
English Translation of MPO Office Action, dated May 28, 2015, issued in Mexican Application No. MX/a/2012/006659.
RBC Capital Markets Receives Notice of Allowance for its THOR Patent from the U.S. Patent and Trademark Office, The Wall Street Journal, dated Jun. 13, 2013, http://online.wsj.com.
"Royal Bank of Canada Gains by Putting the Brakes on Traders", The New York Times DealBook, dated Jun. 25, 2013, http://dealbook.nytimes.com.
United States Patent and Trademark Office, Office Action for U.S. Appl. No. 12/796,139 dated Jun. 21, 2017.
United States Patent and Trademark Office, Office Action for U.S. Appl. No. 12/796,139, dated Oct. 1, 2015.
Canadian Intellectual Property Office, Office Action issued in Canadian Application No. 2,707,196, dated Mar. 18, 2015.
United States Patent and Trademark Office, Office Action issued in U.S. Appl. No. 12/796,139, dated Mar. 23, 2015.
United States Patent and Trademark Office, Office Action issued in U.S. Appl. No. 12/796,139, dated Jul. 22, 2016.
English Translation of Mexican Patent Office, Office Action, dated Dec. 10, 2014, issued in Mexican Application No. MX/a/2012/006659.
Australian Patent Office, Examination Report No. 2, dated Feb. 2, 2018, issued in Australian Application No. 2016200212.
Australian Patent Office, Examination Report No. 1, dated Feb. 6, 2017, issued in Australian Application No. 2016200212.
Australian Patent Office, Examination Report No. 1, dated Dec. 5, 2017, issued in Australian Application No. 2016231624.
Canadian Intellectual Property Office, Office Action, dated Oct. 26, 2015, issued in Canadian Application No. 2,707,196.
Canadian Intellectual Property Office, Office Action, dated Apr. 4, 2016, issued in Canadian Application No. 2,707, 196.
Canadian Intellectual Property Office, Office Action, dated Apr. 28, 2016, issued in Canadian Application No. 2,927,532.
Protest filed with the Canadian Intellectual Property Office under Rule 10 of the Patent Rules and Filing Prior Art under Section 34.1 of the Patent Act, dated Mar. 5, 2018 in Canadian Application No. 2,927,607.
Protest filed with the Canadian Intellectual Property Office under Rule 10 of the Patent Rules and Filing Prior Art under Section 34.1 of the Patent Act, dated Oct. 21, 2016 in Canadian Application No. 2,927,607.
Chinese Patent Office, Office Action, dated Jun. 3, 2015, issued in Chinese Application No. 201080063476.
Chinese Patent Office, Office Action, dated Oct. 23, 2015, issued in Chinese Application No. 201080063476.
Japanese Patent Office, Notice of Reasons for Rejection dated Dec. 6, 2016, in Japanese Application No. 2014-244700.
Singapore Intellectual Property Office, Office Action for CN Application No. 201610326317.3, dated Aug. 3, 2018.
European Patent Office, Extended European Search Report for EP Application No. 16754851.0, dated Jul. 23, 2018.
Canadian Intellectual Property Office, Urgent Protest, dated Jul. 22, 2013, filed at the Canadian Intellectual Property Office in respect of Canadian Patent Application No. 2,707, 196 owned by Royal Bank of Canada.
Canadian Intellectual Property Office, Office Action, dated Sep. 18, 2013, in respect of Canadian Patent Application No. 2,707, 196 owned by Royal Bank of Canada.
United States Patent and Trademark Office, Office Action issued in U.S. Appl. No. 12/796,139, dated Jul. 23, 2013.
United States Patent and Trademark Office, Office Action issued in U.S. Appl. No. 12/796,139, dated Mar. 18, 2014.
United States Patent and Trademark Office, Office Action issued in U.S. Appl. No. 13/281,486, dated Feb. 15, 2012.
United States Patent and Trademark Office, Office Action issued in U.S. Appl. No. 13/281,486, dated Jun. 6, 2012.
Protest filed with the Canadian Intellectual Property Office Under Rule 10 of the Patent Rules and Filing Prior Art Under Section 34.1 of the Patent Act, received Mar. 23, 2016 in Canadian Application No. 2,707,196.
Protest filed with the Canadian Intellectual Property Office under Rule 10 of the Patent Rules and Filing Prior Art under Section 34.1 of the Patent Act, dated Jan. 26, 2016 in Canadian Application No. 2,707,196.
World Intellectual Property Organization, International Search Report and Written Opinion for PCT Application No. PCT/IB2016/051091, dated Jun. 7, 2016.
Australian Government, Intellectual Property Australia, Patent Examination Report No. 1, dated Jan. 19, 2022, issued in Australian Patent Application No. 2021200879.
Korean Intellectual Property Office, Notice of Preliminary Rejection, dated Mar. 29, 2022, issued in Korean Patent Application No. 10-2017-7027276.
Canadian Intellectual Property Office, Office Action, dated Feb. 18, 2022 for Canadian Application No. 3, 109,739.
Mexican Patent Office, Office Action dated Apr. 21, 2022, issued in Mexican Application No. MX/a/2017/0011021.
Mexican Patent Office, Office Action dated Dec. 7, 2021, issued in Mexican Application No. MX/a/2017/0011021.
Canadian Intellectual Property Office, Examiner's Report dated Nov. 15, 2021 for Canadian Application No. 2,913,700.
Australian Government, Intellectual Property Australia, Examination Report No. 2 issued on Application No. 2018274909 dated Aug. 17, 2020.
Australian Government, Intellectual Property Australia, Notice of Acceptance issued on Application No. 2018274909 dated Nov. 3, 2020.
Australian Government, Intellectual Property Australia, Examination Report No. 1 issued on Application No. 2018274909 dated Nov. 18, 2019.
United States Patent and Trademark Office, Notice of Allowance, dated Jan. 16, 2018 in U.S. Appl. No. 15/055,117.
United States Patent and Trademark Office, Notice of Allowance, dated Dec. 21, 2017 in U.S. Appl. No. 15/055,144.
United States Patent and Trademark Office, Office Action for U.S. Appl. No. 15/055,117, dated Jun. 29, 2017.
Canadian Intellectual Property Office, Office Action, dated Aug. 10, 2017 in Canadian Application No. 2,927,607.
United States Patent and Trademark Office, Notice of Allowance dated Nov. 28, 2017 in U.S. Appl. No. 14/565,043.
United States Patent and Trademark Office, Office Action, dated Apr. 6, 2017 in U.S. Appl. No. 14/565,043.
United States Patent and Trademark Office, Office Action dated Apr. 14, 2017 in U.S. Appl. No. 15/055,130.
United States Patent and Trademark Office, Office Action, dated Apr. 7, 2017 in U.S. Appl. No. 15/055,144.
International Search Report and Written Opinion, dated Aug. 26, 2010, issued in International Application No. PCT/CA2010/00872.
Mexican Patent Office, Office Action, dated Feb. 3, 2017, issued in Mexican Application No. MX/a/2016/003193.
Protest filed with the Australian Intellectual Property Office Under Section 27(1) of the Patent Act 1990, dated Apr. 11, 2016 in Australian Application No. 2016200212.
Protest filed with the Australian Intellectual Property Office Under Section 27(1) of the Patent Act 1990, dated Apr. 8, 2016 in Australian Application No. 2016200212.
Japanese Patent Office, Notice of Reasons for Rejection, dated Jan. 19, 2016, in Japanese Application No. 2014-244700.
European Patent Office, Extended European Search Report, dated Oct. 16, 2015 in European Application No. 10835319.4.

(56) References Cited

OTHER PUBLICATIONS

Australian Patent Office, Examination Report No. 2, dated Sep. 2, 2015, issued in Australian Application No. 2010330629.
Protest filed with the Canadian Intellectual Property Office under Rule 10 of the Patent Rules and Filing Prior Art under Section 34.1 of the Patent Act, dated Jan. 15, 2016 in Canadian Application No. 2,707,196.
Mexican Patent Office, Office Action dated Jul. 27, 2016, issued in Mexican Application No. MX/a/2016/003193.
Japanese Patent Office, Office Action dated May 26, 2015, issued in Japanese Application No. 2012-542320.
Australian Patent Office, Examination Report No. 1, dated Sep. 10, 2014 in Australian Application No. 2010330629.
Japanese Patent Office, Office Action dated Jun. 3, 2014, issued in Japanese Application No. 2012-542320.
Chinese Patent Office Office Action dated Aug. 1, 2014, issued in Chinese Application No. 201080063476.
Canadian Intellectual Property Office, Office Action, dated Sep. 18, 2013, issued in Canadian Application No. 2,707,196.
United States Patent and Trademark Office, Office Action dated Oct. 24, 2013 issued in U.S. Appl. No. 13/941,513.
United States Patent and Trademark Office, Office Action dated Sep. 16, 2014 issued in U.S. Appl. No. 13/941,513.
International Bureau of World Intellectual Property Organization, International Preliminary Report on Patentability dated Jun. 12, 2012, issued in International Application No. PCT/CA2010/000872.
Christodoulopoulos et al., "Delay Components of Job Processing in a Grid: Statistical Analysis and Modeling", Third International Conference on Networking and Services (ICNS'07), IEEE Computer Society, dated Jun. 25, 2007.
Van Kerel, V. "Liquidity: What You See is What You Get?", Department of Finance, Tilburg University, TILEC, CentEr, dated Apr. 2012.
Federspiel, F. et al., "High Frequency Trading and the Evolution of Liquidity in U.S. Equity Markets", dated Aug. 25, 2009.
Qualitative Services Group LLC, "Beware the VWAP Trap", dated Nov. 9, 2009.
Arnuk, S. et al., "The Real Power Behind Predatory High Frequency Trading", Themis Trading LLC: Latency Arbitrage, dated Dec. 4, 2009.
Ramage, J., "New Studies Assess High-Frequency Trading Impact", Traders Magazine Online News, dated Dec. 9, 2009.
Erman, B., "Putting the Hammer to High-Frequency Traders", The Globe and Mail, dated Jan. 15, 2011, http://license.icopyright.net.
D'Antona, John, Jr., "RBC Rollout Designed to Stymie HFT", Trades Magazine, dated Feb. 11, 2011, http://www.tradesmagazine.com.
Global Equities; TABB Group, Mizen, M./Jones, A; V09:038; U.S. Equity Trading 2011/12: Coverage Under Fire: dated Nov. 2011.
Rosenblatt Securities Inc., "Market Structure Analysis & Trading Strategy; Let There Be Light", Trading Talk, dated Sep. 17, 2010.
"GETCO Launches High-Frequency Trading Tools for Institutions", dated Jun. 9, 2011, http://www.fiercefinanceit.com.
Healey, R. et al., "European Algorithms: The Evolution", dated Aug. 8, 2011, http://tabbgroup.com.
Robotti, A., "A Bank's Embrace of Electronic Trading Pays Off", dated Mar. 2, 2011, https://secure.globeadvisor.com.
Banerjee, D, "CVC Drops Takeover of ConvergEx Amid SEC", Justice Probes of Bermuda Unit, dated Dec. 23, 2011, http://www.bloomberg.com.
Jefferies; "A Report on Information Arbitrage (IA) & Its Impact on Execution Quality", Electronic Trading Desk, dated Nov. 3, 2009.
Grant, J., "Why Speed Traders Slow Down on Purpose", Advanced Trading, dated Jun. 22, 2012, http://advancedtrading.com.
Rosenbush, S. "RBC Takes on High Frequency Predators", Institutional Investor, Feb. 2, 2012, http://www.institutionalinvestor.com.
http://www.automatedtrader.net, First published in Automated Trader Magazine, Issue 22 Q3 2011, Sponsored Articles, "Just Showing up "on Time" Isn't Enough".
SunGard, "SunGard Identifies Ten Trends in Electronic Trading for 2012", dated Jan. 17, 2012.
Bowbliss, K.M.; Mizen, M., "Volatility Spurs Aggressive Algo Strategies: Advanced Trading", "How Buy-Side Traders Are Adapting to the Volatility" dated Jan. 25, 2012.
IRESS, "IRESS Best Market Router", Implementation Guide, dated Dec. 7, 2011.
IRESS, "IRESS Best Market Router", Implementation Guide, dated Jan. 11, 2012.
ConvergEx Group, "Options Algorithims: Empowering You with Sophisticated Tools", dated Jun. 12, 2012, http://www.convergex.com.
The Wall Street Journal, "Thor Enters the High-Frequency Trading Arms Race", dated Jan. 14, 2011, http://blogs.wsj.com.
D'Silva, K., "An Arbitrageur's View", dated Jan. 15, 2011.
Canadian Intellectual Property Office, Examiner's Report dated Jan. 12, 2023 for Canadian Application No. 3,109,739.
Canadian Intellectual Property Office, Examiner's Report dated Mar. 8, 2023 for Canadian Application No. 2,913,700.

\* cited by examiner

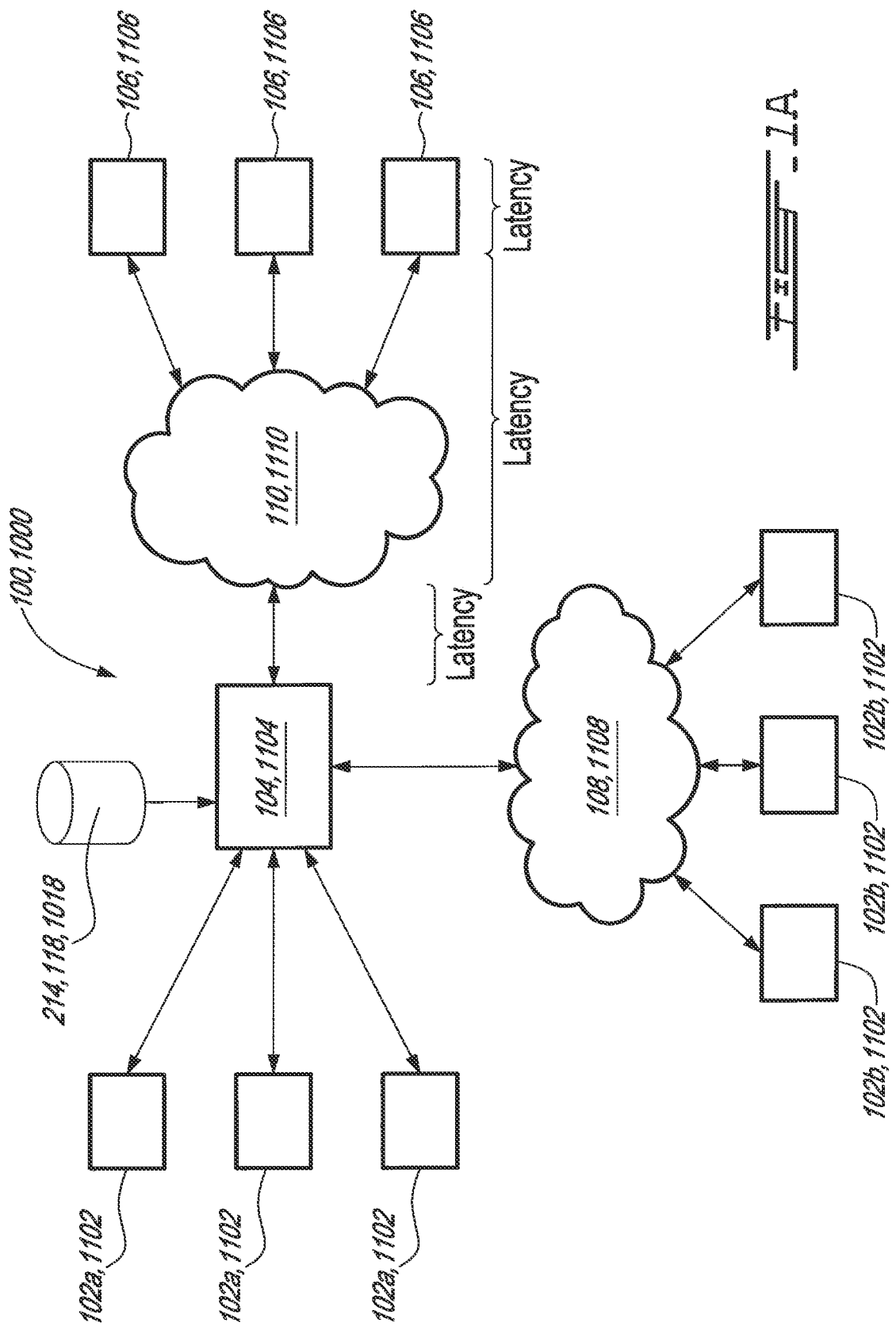

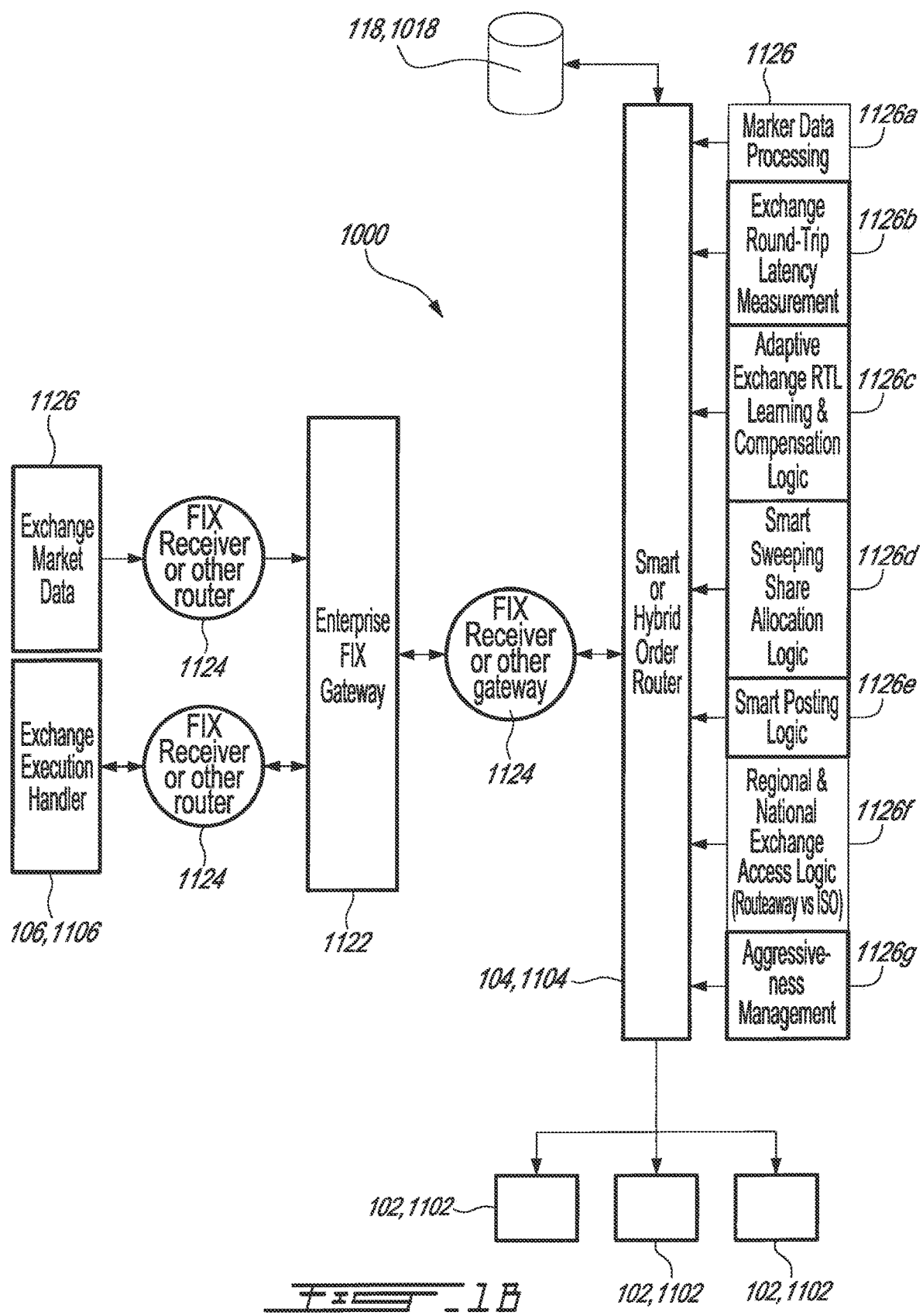

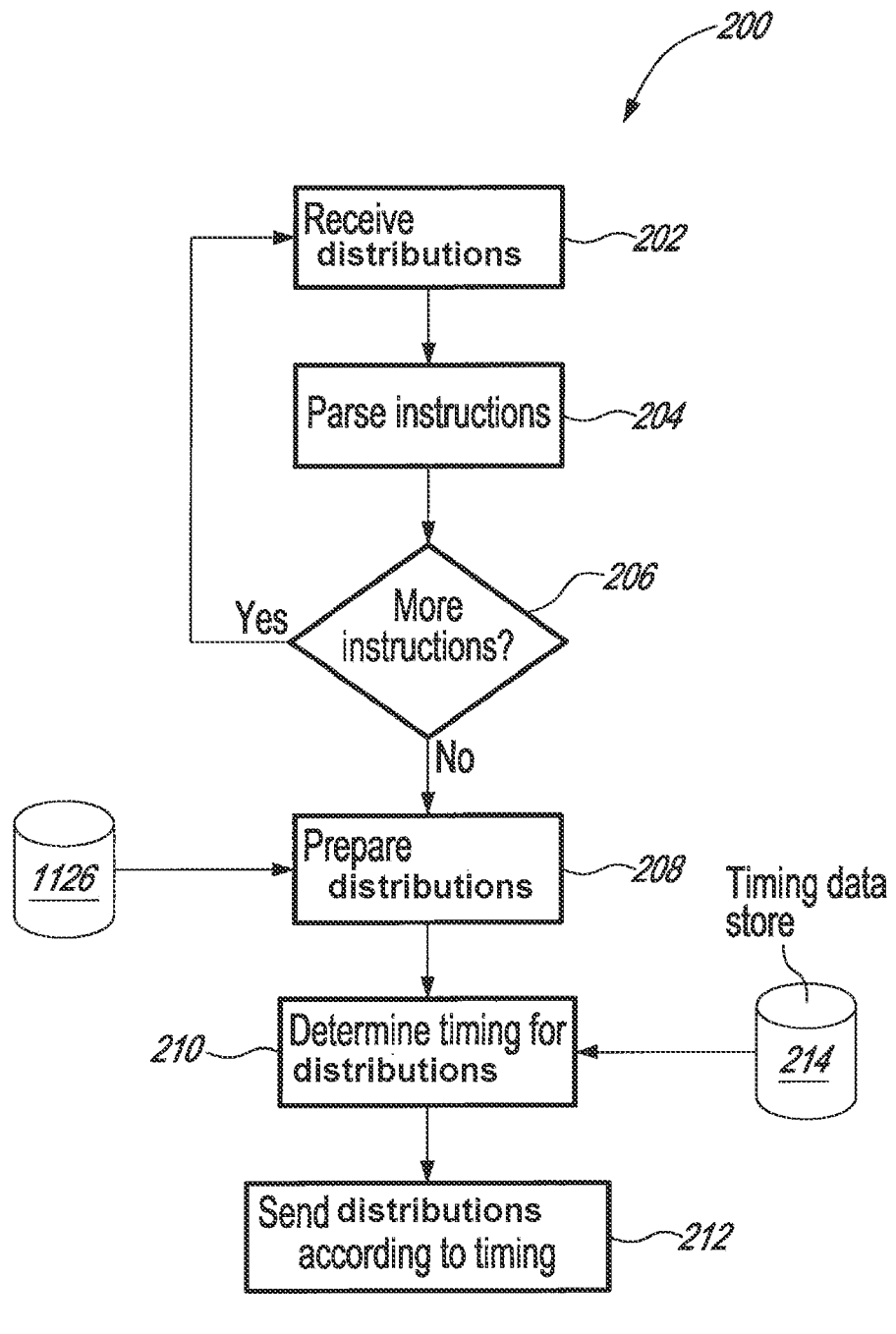

94% Fill rate 630, 106,1106

| | | | | | | |
|---|---|---|---|---|---|---|
| LEVEL 1 - 94% Fill Rate | | | | SCR@.01 | | Trade-ex |
| Sold | 549,200 | $ | 4.21 | EDGA | $ 5,492 | $ 110 |
| Sold | 339,100 | $ | 4.21 | NQBX | $ 3,391 | $ 34 |
| Sold | 32,700 | $ | 4.21 | CBOE | $ 327 | $ (33) |
| Sold | 1,105,600 | $ | 4.21 | NYSE | $ 11,056 | $ (1,990) |
| Sold | 537,800 | $ | 4.21 | BATS | $ 5,378 | $ (1,345) |
| Sold | 959,100 | $ | 4.21 | ARCA | $ 9,591 | $ (2,590) |
| Sold | 554,900 | $ | 4.21 | EDGX | $ 5,549 | $ (1,554) |
| Sold | 645,100 | $ | 4.21 | NSDQ | $ 6,451 | $ (1,935) |
| LEVEL 2 - Completed | | | | | | |
| Sold | 276,500 | $ | 4.20 | ARCA | $ 2,765 | $ (747) |
| TOTAL | 5,000,000 | | 4.2094 | | $ 50,000 | $ (10,049) |

FIG. 6A

47% Fill rate ** 630, 106,1106

| | | | | | | |
|---|---|---|---|---|---|---|
| LEVEL 1 - 47% Fill Rate | | | | SCR@.01 | | Trade-ex |
| Sold | 549,200 | $ | 4.21 | EDGA | $ 5,492 | $ 110 |
| Sold | 339,100 | $ | 4.21 | NQBX | $ 3,391 | $ 34 |
| Sold | 32,700 | $ | 4.21 | CBOE | $ 327 | $ (33) |
| Sold | 1,105,600 | $ | 4.21 | NYSE | $ 11,056 | $ (1,990) |
| Sold | 348,000 | $ | 4.21 | BATS | $ 3,480 | $ (870) |
| LEVEL 2 - 43% Fill Rate | | | | | | |
| Sold | 217,200 | $ | 4.20 | EDGA | $ 2,172 | $ 43 |
| Sold | 163,900 | $ | 4.20 | NQBX | $ 1,639 | $ 16 |
| Sold | 653,000 | $ | 4.20 | CBOE | $ 6,530 | $ (653) |
| Sold | 120,100 | $ | 4.20 | NYSE | $ 1,201 | $ (216) |
| Sold | 453,100 | $ | 4.20 | BATS | $ 4,531 | $ (1,133) |
| Sold | 560,000 | $ | 4.20 | ARCA | $ 5,600 | $ (1,512) |
| LEVEL 3 - Completed | | | | | | |
| Sold | 134,600 | $ | 4.19 | EDGA | $ 1,346 | $ 27 |
| Sold | 51,700 | $ | 4.19 | NQBX | $ 517 | $ 5 |
| Sold | 271,800 | $ | 4.19 | BATS | $ 2,718 | $ (272) |
| TOTAL | 5,000,000 | | 4.2038 | | $ 50,000 | $ (6,443) |

FIG. 6B (PRIOR ART)

| Fills using conventional methods and systems | | | Consolidated Tape | | |
|---|---|---|---|---|---|
| Sold | 2,374,600 | $ 4.21 | 2,374,600 | $ | 4.21 |
| Sold | 2,167,300 | $ 4.20 | 4,659,695 | $ | 4.20 |
| Sold | 458,100 | $ 4.19 | 984,915 | $ | 4.19 |
| Totals | 5,000,000 | $ 4.2038 | 8,019,210 | $ | 4.2017 |
| Outperformance vs. Avg. Price Benchmark | | | | | 0.0021 |

| Fills using example of disclosed method and system | | | Consolidated Tape | | |
|---|---|---|---|---|---|
| Sold | 4,700,000 | $ 4.21 | 5,000,000 | $ | 4.21 |
| Sold | 300,000 | $ 4.20 | 3,019,210 | $ | 4.20 |
| Totals | 5,000,000 | $ 4.2094 | 8,019,210 | $ | 4.2062 |
| Outperformance vs. Avg. Price Benchmark | | | | | 0.0032 |

FIG. 7

SYNCHRONIZED PROCESSING OF DATA BY NETWORKED COMPUTING RESOURCES

CROSS-REFERENCE TO RELATED APPLICATIONS

This application is a continuation of U.S. patent application Ser. No. 16/880,537 filed May 21, 2020 and entitled "SYNCHRONIZED PROCESSING OF DATA BY NETWORKED COMPUTING RESOURCES", which is a continuation of U.S. patent application Ser. No. 15/908,543, filed Feb. 28, 2018, which is a continuation of U.S. patent application Ser. No. 14/565,043, filed Dec. 9, 2014, which is a continuation-in-part of U.S. patent application Ser. No. 12/796,139, filed Jun. 8, 2010 and entitled "SYNCHRONIZED PROCESSING OF DATA BY NETWORKED COMPUTING RESOURCES;" and of U.S. patent application Ser. No. 13/941,513, filed Jul. 14, 2013 and entitled "SYNCHRONIZED PROCESSING OF DATA BY NETWORKED COMPUTING RESOURCES;" and claims all benefit, including priority, of those applications and of U.S. Provisional Patent Application No. 61/285,375, filed Dec. 10, 2009 and entitled "SYNCHRONIZED PROCESSING OF DATA BY NETWORKED COMPUTING RESOURCES." The entire contents of each of such applications, including any attachments or appendices thereto, is herein incorporated by this reference.

TECHNICAL FIELD

The present disclosure relates generally to systems, methods, and machine-interpretable programming or other instruction products for the management of data processing by multiple networked computing resources. In particular, the disclosure relates to the synchronization of related requests for processing of data using distributed network resources.

Aspects of the material disclosed in this application relate to the holding, transfer, and/or administration of securities and other financial interests. Aspects of such holding, transfer, and/or administration may be subject to regulation by governmental and other agencies. The disclosure herein is made solely in terms of logical, programming, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

BACKGROUND

In various forms of networked or otherwise distributed data processing systems, complex and/or multiple related processes are often routed to multiple computing resources for distribution, dissemination or execution.

For example, it has been observed that release of data signals representing information content such as market data related to the trading of various financial instruments may also have significant effects on markets such as exchanges, and in other forms of social and/or economic interchange.

The financial instruments may include, for example, various types of securities, equities, bonds, futures, options contracts, various types of derivatives, and so forth.

Market data may include, for example, but is not limited to: order acknowledgements; order executions; order confirmations; open orders; market orders; basic market data or level 1 data such as bid price, bid size, ask price, ask size, last price, and last size; volume information; additional market data or level 2 data, such as market data that relates to order book or depth of the market including highest bid prices that traders are willing to pay to buy a security (e.g. 5 or 10 prices depending on the market), bid sizes (e.g. the number of securities that are available at each of the highest bid prices); lowest ask prices that traders are willing to accept to sell a security; ask prices or the number of securities that are available at each of the lower ask prices; and next best bid; quotes; open interest (e.g. the number of buy market orders before the stock market opens); change in open interest; exchange of contract for related position (ECRP) volume; the number of securities available for sale; the number of securities sought to be purchased at each offer and bid price; information regarding cancelled, non-published, non-completed and/or unexecuted orders; calculated market data (e.g. imbalances and indices) and other price information.

Market data may also include aggregation of various elements of market data; such as a aggregated set of trading volume information. The market data may be publicly available; or non-publicly available.

Other types of market data may also be contemplated by a skilled person.

Market data may be provided by and/or generated from a variety of sources. For example, sources of market data may include, but are not limited to, backend order management systems; order fulfillment systems; exchanges; exchange matching engines (processing buy/sell orders and applying different rules of different exchanges); equity trading facilities such as alternative display facilities (ADFs), for example, the ADF of the U.S. Financial Industry Regulatory Authority); electronic communication networks (ECNs) for matching buy and sell orders, used, for example, to connect brokers to individual traders for processing orders; security information processors (SIPs) for carrying trade and order information; trade reporting services (TRS); and transaction reporting services (e.g. Euronext).

Recipients of market data may include a variety of stakeholders, some of whom use the market data for various purposes upon receipt. These recipients may include, but are not limited to: institutional traders; brokerages; high frequency traders; retail investors; individual traders; exchanges (because they often consume the data of other exchanges); alternative trading systems (such as "black pools"); analysts, industry regulators, and market data providers or market data vendors.

Market data may generally be provided in the form of raw data, communicated as network packets. In some embodiments, market data may also be in various formats, such as media files and/or with formatting applied.

Generally, market data may be sent shortly after it is generated, and as continuously as possible, subject to consolidation rules for consolidated streams. Normally, each source of market data operates a data service implemented using "send rules" based on continuous sending of market data.

The timing of the release of market data, such as order confirmations and other information content data sets can be of significant, and even crucial importance. For example, even small differences in the timing of availability of information represented by such content can be used to advantage, fairly or unfairly, by those who are in a position to act upon it first. In such cases it can be advantageous to ensure that the availability or distribution of such information to various parties, such as market participants, is synchronized or otherwise controlled, so as, for example, to prevent unfair or unjust exploitation of the content.

Thus, as will be apparent to those skilled in the relevant arts, it can be advantageous in many situations to synchronize or otherwise control routing of signals representing market data and/or other information content to pluralities of networked computing resources, so as to permit, or otherwise enable, such signal data sets to arrive, or otherwise be available for interpretation, execution, and or other processing, by such networked computing resources simultaneously, or according to other desired synchronization schemes, as described herein. For example, it can be advantageous, or otherwise desirable, to cause information content data sets representing news or other information to arrive at such networked computing resources in such fashion as to enable the networked computing resources to access, parse, interpret, and display or otherwise process content represented by such signals in synchronized fashion. Such processing can, for example, include fully- or semi-automated parsing or analysis of such content, for manual and/or fully- or semi-automated interpretation, or other use, of the information represented by such content. For example, such synchronization can be used to control manual and/or fully- or semi-automated interpretation of such content in subsequent generation, routing, cancellation, and/or other execution or processing of data sets representing proposed transactions in financial interests.

Prior art documents, such as the Rony Kay article "Pragmatic Network Latency Engineering, Fundamental Facts and Analysis, have attempted to address problems such as those described above by proposing elimination of one-way communications (i.e., "packet") latencies. Such systems fail to address arbitrage opportunities and other issues caused or facilitated by variations in the time required for multiple processors to execute individual portions of multiple-processor execution requests (i.e., execution latencies), in addition to (or as part of) communications latencies.

SUMMARY

In various aspects the invention provides systems, methods, and computer-executable instruction mechanisms (e.g., non-transient machine-readable programming structures) such as software-coded instruction sets and data, for the management of data processing by multiple networked computing resources. In particular, for example, the invention provides systems, methods, and coded instruction sets useful in controlling the synchronization of related requests for processing of data using distributed network resources.

For example, in a first aspect the invention provides systems, methods, and programming or other machine-interpretable instructions for causing synchronized processing of data by multiple networked computing resources, such systems, for example, comprising at least one processor configured to execute machine-interpretable instructions and causing the system to:
  receive from one or more data sources signals representing instructions for execution of at least one data process executable by a plurality of networked computing resources;
  divide the at least one data process into a plurality of data processing segments, each data processing segment to be routed to a different one of a plurality of networked execution processors;
  based at least partly on latencies in execution of prior data processing requests routed by the system to each of the plurality of networked execution processors, determine a plurality of timing parameters, each of the plurality of timing parameters to be associated with a corresponding one of the plurality of data processing segments, the plurality of timing parameters determined to cause synchronized execution of the plurality of data processing segments by the plurality of networked execution processors; and
  using the timing parameters associated with the plurality of data processing segments, routing the plurality of data processing segments to the plurality of corresponding networked execution processors.

In some embodiments, as will be explained herein, the networked execution processors can, for example, comprise exchange servers, and the data processing segments represent requests for trades in financial interests such as commodities and/or intangible interests such as stocks, bonds, and/or various forms of options.

The plurality of determined timing parameters can be used in determining and implementing timing sequences in order to implement desired sequential execution of data processing requests in accordance with the invention, and can for example represent and/or be based wholly or partially upon latencies in execution of data processing requests due many factors. For example, such parameters can be wholly or partially based on dynamically-monitored latency (ies) in execution of signal processing requests previously routed by the system to at least one of the plurality of networked execution processors. Such latencies may be caused by many factors, including, for example, various types of communication and data processing delays. Such timing parameters may further based on statistical, e.g., probability, models of observed latency data, and patterns therein.

Such systems, methods, and programming or other machine-interpretable instructions may further be configured such that they cause a system to:
  associate with each of at least one of the plurality of data processing segments data representing at least one quantity term, the at least one quantity term representing at least one quantity of a financial interest to be traded in accordance with a request represented each of the at least one data processing segments, and at least one corresponding price term associated with each such quantity term, the quantity term representing at least one proposed price at which a trade represented by the at least one data processing segment is to be executed;
  the at least one quantity term larger than at least one quantity of the financial interest publicly offered at a price equivalent to the corresponding associated price term, in a market associated with the networked execution processor(s) to which the at least one data processing segment is to be routed.

Such quantity terms can, for example, be determined based at least partly on trading histories associated with the market(s) associated with the networked execution processor(s) to which the data processing segments are to be routed. They can be determined on data relating to displayed or undisplayed offerings and/or trades, including for example historical undisplayed oversize or reserve quantities.

In further aspects, the invention provides systems, methods, and computer-executable instruction mechanisms for managing the routing and/or other release of market data and/or other information content through, for example, the association, with signals representing market data and/or information content to be routed to a plurality of networked computing resources, at least one timing parameter determined at least partly using one or more latencies associated with the receipt or the execution of signal processing requests by at least one of the networked computing resources; and using the at least one associated timing parameter, route the signals representing information content to the plurality of networked computer resources; the at least one associated timing parameter determined so as to cause synchronized arrival of the signals representing information content at the plurality of networked computer resources.

In such aspects, accordingly, the invention enables, synchronization and/or other control routing of signals representing market data and/or other information content to pluralities of networked computing resources, so as to permit, or otherwise enable, such signal data sets to arrive, or otherwise be available for interpretation, execution, and or other processing, by such networked computing resources simultaneously, or according to other desired synchronization schemes, as described herein. For example, the invention can cause information content data sets representing market data or other information to arrive at such networked computing resources in such fashion as to enable the networked computing resources to access, parse, interpret, and display or otherwise process content represented by such signals in synchronized fashion. Such processing can, for example, include fully- or semi-automated parsing or analysis of such content, for manual and/or fully- or semi-automated interpretation, or other use, of the information represented by such content. For example, such synchronization can be used to control manual and/or fully- or semi-automated interpretation of such content in subsequent generation, routing, cancellation, and/or other execution or processing of data sets representing proposed transactions in financial interests.

In order to ensure, for example, that market data or other information is made available to pluralities of recipient systems simultaneously, or in other desired synchronized fashion, it can be advantageous to synchronize various aspects of the arrival of corresponding information content data sets in various ways. For example, it may be particularly advantageous in the case of relatively short information items to ensure the synchronized arrival of the start of the content data set, or data record. In the case of larger content data sets, it may be advantageous to ensure the simultaneous arrival of the end, or a desired portion, of the content data set. In either case it is possible, among other advantages, to control the time at which information is available to targeted recipient systems for interpretation, display, analysis, and/or other processing. Using processes and systems disclosed herein, synchronized disclosure of information to multiple recipients can potentially be provided within very small fractions of a second, such as one or more milliseconds, microseconds, nanoseconds, or less. The invention may provide precise synchronization of the release of information.

In further aspects the invention provides systems, methods, and programming or other machine-interpretable instructions for causing synchronized processing of data by multiple networked computing resources, such systems, for example, comprising at least one processor configured to execute machine-interpretable instructions and causing the system to:

monitor execution of signal processing execution requests by each of the plurality of networked computing resources;

determine at least one timing parameter associated with a latency in execution of signal processes between the system and each of the plurality of networked computing resources; and store the at least one timing parameter in machine-readable memory accessible by the at least one processor.

Monitoring of execution of signal processing execution requests according to such and other embodiments of the invention can be implemented on continual, periodic, and/or other suitable or desirable bases.

In various embodiments of the various aspects of the invention, the networked computing resources can include one or more exchange, market data, content management, content delivery or other data processing servers. The data sources can include one or more broker or trader systems or servers, one or more servers at exchanges, one or more order fulfillment/order management servers, and/or individuals, corporate, government, and/or other news or communications servers, etc.; the controlled signal processes can represent trades in financial interests, and the execution of signal processing execution requests represents the execution of transactions in financial interests, including for example stocks, bonds, options and contract interests, currencies and/or other intangible interests, and/or commodities; and/or information content such as market data and/or other information content affecting businesses, economies, technologies, markets, commodities, governments, individuals, or events, etc.

In various embodiments, requests for execution of data processing procedures can be based wholly or partially on parameters including, for example, any one or more of current market data quotations, order routing rules, order characteristics, displayed liquidity of each networked computing resource, and a probable delay, or latency, in execution of an order quantity at each networked computing resource.

In the same and other embodiments, requests for execution of processing procedures can be based wholly or partially on algorithms useful for displaying, parsing, and/or otherwise manually, and/or fully or semi-automatically interpreting and/or otherwise processing market data and/or other information content.

As will be understood by those skilled in the relevant arts, embodiments of the invention adapted for synchronized execution of financial transactions and other processes can be used in any of a very wide variety of combinations with embodiments adapted for controlled routing of market data and/or information content such as news, etc. Such combinations can, for example, be useful in ensuring that market transactions etc., do and/or do not occur in view of the publication of market data, developing events or information releases.

In the same and further aspects the invention provides systems for controlling or otherwise managing requests for processing of data by distributed computer resources, such systems including one or more processors configured to execute instructions for causing the system to:

monitor receipt of market data and/or information content by each of the plurality of networked computing resources;

monitor execution of signal processing execution requests by each of the plurality of networked computing resources;

determine at least one timing parameter associated with the latency in execution of signal processes between the system and each of the plurality of networked computing resources; and store the at least one timing parameter for each of the plurality of networked computing resources.

Among the many advantages offered by the invention is the possibility of monitoring latencies and other factors in networked processing of multi-part or other complex data processing requests on a dynamic, or 'rolling', basis, and using such dynamically-monitored latencies and/or other factors in determining timing parameters to be used in implementing synchronized processing requests, as disclosed herein. Timing parameters used in implementing synchronized processing requests can be monitored and/or determined on continuous, continual, periodic, or other bases, depending upon the needs, objectives, and other factors of the applications in which they are to be applied.

A further advantage offered by the invention is reduction or elimination of the need for consideration of one-way communications latencies, e.g., the need to minimize latencies in communications between routing and execution processors.

As will be appreciated by those skilled in the relevant arts, once they have been made familiar with this disclosure, synchronization of execution of distributed data processing requests by, for example, synchronized transmission of requests for such processing, has a great many possible applications in a large number of data processing fields.

BRIEF DESCRIPTION OF THE DRAWINGS

Reference will now be made to the drawings, which show by way of example embodiments of the present disclosure.

FIGS. 1A, 1B, and 3 show examples of systems suitable for causing processing of data by multiple networked computing resources in accordance with various aspects of the invention.

FIGS. 2 and 4 show flowcharts illustrating examples of methods for causing processing of data by multiple networked computing resources in accordance with various aspects of the invention.

FIGS. 6A and 6B show a comparison of fill ratios using an example method and system for processing of data by multiple networked computing resources versus using a conventional method and system.

FIG. 7 illustrates the use of an example metric for comparing an example method and system for processing of data by multiple networked computing resources versus results of using a prior art method and system.

Throughout the appended drawings, like features are identified by like reference numerals.

DESCRIPTION OF EXAMPLE EMBODIMENTS

Figure 3:
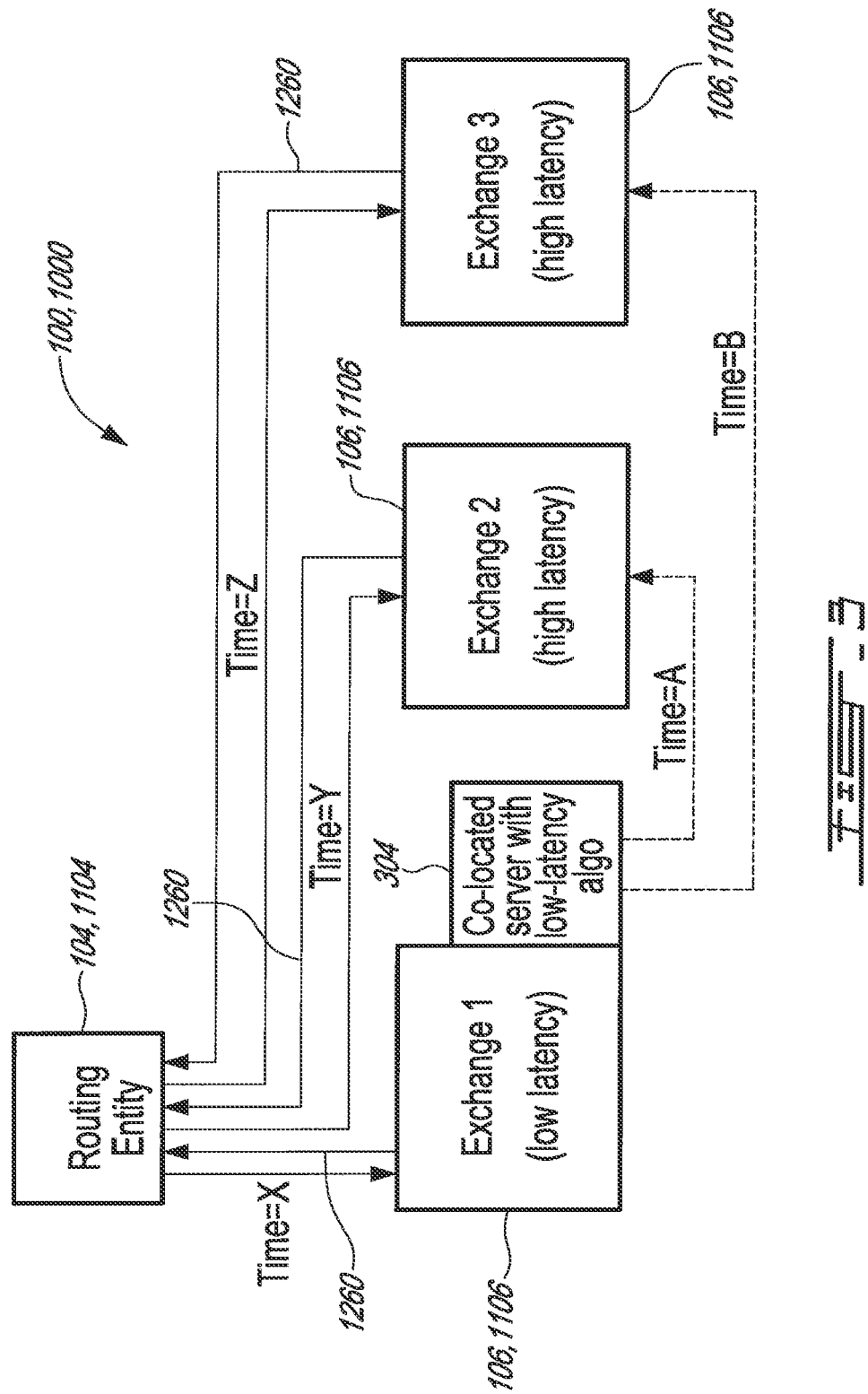

In this disclosure, as will be understood by those skilled in the relevant arts, 'synchronized' means according to any desired timing sequence, whether regular, irregular, and/or wholly or partially simultaneous. In some embodiments, 'synchronized' may also mean timing sequences where content is distributed or disseminated to different groups, each group having one or more timing sequences.

In some embodiments, a system is provided for synchronizing transmission of one or more data sets comprising market data for the synchronized arrival to one or more recipients.

Market data may include, for example, but is not limited to: order acknowledgements; order executions; order confirmations; open orders; market orders; basic market data or level 1 data such as bid price, bid size, ask price, ask size, last price, and last size; volume information; additional market data or level 2 data, such as market data that relates to order book or depth of the market including highest bid prices that traders are willing to pay to buy a security (e.g. 5 or 10 prices depending on the market), bid sizes (e.g. the number of securities that are available at each of the highest bid prices); lowest ask prices that traders are willing to accept to sell a security; ask prices or the number of securities that are available at each of the lower ask prices; and next best bid; quotes; open interest (e.g. the number of buy market orders before the stock market opens); change in open interest; exchange of contract for related position (ECRP) volume; the number of securities available for sale; the number of securities sought to be purchased at each offer and bid price; information regarding cancelled, non-published, non-completed and/or unexecuted orders; calculated market data (such as imbalances, indices) and other price information.

Market data may also include aggregation of various elements of market data; such as a aggregated set of trading volume information. The market data may be publicly available; or non-publicly available.

Other types of market data may also be contemplated by a skilled person.

Market data can exist in different forms, such as in individualized and aggregate form (such as in the case of a consolidated feed of market data). The same data may be represented in different forms of market data. For example, information related to a trade may exist in an individualized form (which is generally shared with the participants in the trade) and this same data (or aspects of this data) may then be represented in a consolidated feed.

Generally, market data may be sent as shortly after it is generated and/or received by one or more sources of market data, and as continuously as possible, subject to consolidation rules for consolidated streams that may provide aggregations of market data.

Typically, each source of market data may operate a data service which applies one or more sets of "send rules" to the sending of the market data. The data services may be segregated into various "tiers" of service, and each "tier" may have its own set of "send rules".

The one or more sets of send rules may, for example, provide various parameters and/or various instructions that determine how market data is collected and/or is sent to target recipients. Such parameters and/or instructions may determine, for example, how often data is sent, when data is sent, what format data is sent in, what information to send, how data is aggregated/consolidated, etc.

The send rules may differ between one or more tiers of recipients where, in some embodiments, each tier represents a particular group of recipients who is subscribed for data services for market data. These tiers may be established based on various reasons, such as type of recipient (institutional or individual), which data services package was purchased, etc.

In a non-limiting, illustrative example, recipients may be segregated into three tiers through subscription into different data services packages, a first tier that receives the market data first, a second tier that receives the market data after a period of time, and a third tier that receives the market data after the second tier receives the data.

In some embodiments, the data may be provided to recipients depending on the various characteristics of the recipients, such as whether they were participants in the execution of a trade. For example, a recipient that is a participant in the execution in a trade may receive a confirmation of the trade first, and then data related this execution may become available later in a consolidated form to other parties.

It may be very important for different recipients to receive certain market data at the same time as other recipients. Particularly as it relates to receipt of market data that relates to executions, it may be very important that recipients receive the market data at the same time, for example, from exchanges, otherwise there may be regulatory consequences to exchanges, including fines.

Synchronized receipt of market data may be distinguished from the synchronized transmission of market data. Even if the market data were sent from the same time from a source, various reasons may exist for recipients obtaining information faster than other recipients. For example, a recipient located in close proximity, with a superior network connection (e.g. microwave connection compared to a traditional wired or fiber optic connection), etc. may receive data prior to another recipient.

Various recipients of market data may want to ensure that there is a level playing field, in that they receive market data from one or more sources at the same time as other recipients. The level playing field may be important to prevent information asymmetries between one or more recipients, which may be detrimental to the financial performance of the recipients who received the market data after the receipt of the market data by other recipients. For example, an earlier recipient may engage in practices such as electronic front running and/or other predatory trading strategies to the financial detriment of later recipients.

Also, in many cases, recipients access data using a paid data service, and the providers of such paid data services may be motivated to provide a consistent service to their customers. For example, a provider of market data may wish to send market data in a way such that the market data arrives to all recipients in the first tier at the same time. Accordingly, a first recipient in the first tier would receive the market data at the same time as a second recipient in the first tier, and would not have an information advantage as compared to the first recipient. Similarly, the provider of market data may also wish to send the market data such that the market data is arrives to the recipients in the second tier at the same time.

Providing a consistent service may help maintain investor confidence among the recipients that recipients in a given tier of service will be treated fairly as it relates to the receipt of market data.

Some recipients accessing information earlier than others, and then exploiting this early access for their gain, may have regulatory or brand reputation consequences, which the system may help reduce.

In some embodiments, the system associates to the send rules normally applicable to a set of market data an additional set of rules for synchronizing the arrival of market data to multiple target recipients.

The additional set of rules for synchronizing the arrival of market data to multiple target recipients may be based various factors, such as networking characteristics (e.g. connection speed, available bandwidth, network congestion, expected latency, predicted latency, routing device characteristics, packet route, packet loss).

In some embodiments, the latency may be volume dependent. For example, when large bursts of data are being sent, the latency for individual packets can increase as well.

The additional set of rules, when associated with the send rules for market data, may, for example, attempt to cause a packet to arrive at the systems for one or more recipients approximately 100 ms after being designated for sending from the source. In this example, the additional set of rules may provide additional latency or staggered sending of the packets so that the packets arrive in a synchronized manner. In some embodiments, the additional set of rules may be configured such that packets are designed to arrive within a particular band of time (e.g. packets are designed to arrive 90-110 ms of being sent).

FIG. 1 shows an example of a system 100 suitable for causing processing of data by multiple networked computing resources in accordance with the invention.

In the example shown, system 100 includes one or more signal or data sources 102 (comprising one or more each of sources 102a, 102b), execution router processor(s) 104, and one or more networked computing resources, or execution processors, 106. In some embodiments, data sources 102 may include one or more internal data sources 102a, which may communicate with the router 104 directly (e.g., through private local- or wide area network(s) or other secure wireless or wireline communication, through direct communication channel(s) or through communication(s) within a single server). In the same and/or other embodiments, data source(s) 102 may also include one or more external data sources 102b, which may for example communicate with router processor(s) 104 via one or more public networks 108 (e.g., a public or private telecommunications network such as the internet), using suitable or otherwise desired network security devices, which may for example include data encryption, etc. In the example shown, router processor(s) 104 communicate with each of the one or more networked execution, or computing, resources 106 via a network 110, which may be the same as or different than network(s) 108.

In various embodiments, data source(s) 102 may include devices that provide, on behalf of one or more entities that generate or distribute information, instructions, market data and/or other content, signals that communicate data and/or instructions related to execution of data processing processes to router processor(s) 104, which data and/or instructions the router processor(s) 104 may process (e.g., aggregate by summing, averaging, etc.; and/or divide into segments, etc.) and use as bases for requests for processing, dissemination and/or distribution of data by the networked computing resources 106. Data sources 102a, 102b may include, for example, systems, servers, processors and/or any other suitable source(s) of information, instructions, news and/or other content. Each or any of data source(s) 102, processor(s) 104, and resources 106 may include multiple such systems, servers or processors.

In some embodiments, data source(s) 102 may also include systems, servers or processors that store or have access to secure or confidential information to be processed, disseminated or distributed. For example, data source(s) 102 may also include a server at an exchange wherein the server has access to the databases of the exchange, which may contain confidential information to be released to the public at a later time.

As an illustrative, non limiting example, a server at an exchange may store order confirmation information which may be generated upon fulfillment of a trade order.

In various embodiments, some or all of data source(s) 102 and router processor(s) 104 may be combined, and/or otherwise configured to implement multiple programming or other machine instruction applications running on single machines.

Networked computing resources 106 may include any devices or other resources that communicate with router processor(s) 104 to receive and carry out any of a very wide variety of data processing requests. Such networked computing resources 106 may include systems, servers, processors or any other suitable devices adapted for execution of any processes suitable for use in implementing the invention, including, for example, distribution of information, providing information to various external servers, publication of information, hosting of information on various networks, etc., and/or other data processing tasks, such as word or document processing, image, and/or other communications or documentation tasks.

In various embodiments, the one or more data sources 102 transmit or otherwise provide to or for the router processor(s) 104 signals representing information content, instructions, or requests, for executing data processing functions. Instructions from any given data source(s) 102 may include instructions for signal processes to be executed by any one or more networked computing resources 106. Requested signal processes may include, for example, computing operations, data manipulations, and/or communications processes or other signal exchanges, among others. In some but not necessarily all examples, such instructions may specifically identify networked computing resource(s) 106 particularly targeted for execution of such processes.

Instructions from any given data source(s) 102 may further include instructions to be executed by the router processor(s) 104. These instructions may include, for example, parameters regarding the distribution and dissemination of content, such as arrival time, preferable data routing routes, additional overhead or metadata, etc.

The instructions may include networking parameters for transmitting data or content, or receiving data or content, from one or more computers. The networking parameters may be determined using one or more network characteristics associated with the transmitting or receipt of market data from one or more of the plurality of computer systems. The networking parameters may be determined based on one or more network characteristics, including latency, reliability of communication networks (including particular network links), network routing, low/high bandwidth channels, or packet loss.

The networking parameter may include a timing parameter to address latency, or a routing path or packet sizing to address the network characteristics, while achieving synchronized arrival of the market data.

The one or more computers may be associated with subscribers. Also, service levels or tiers may be associated with different groups of subscribers. The parameters regarding the distribution and dissemination of content may include specific instructions from any given data source(s) 102 for distribution and dissemination of content, dependent on the applicable service level or tier of the one or more subscribers.

Router processor(s) 104 may parse instruction signals received from one or more source(s) 102 and use such signals to prepare instructions, or requests, to be forwarded to pluralities of execution processors 106, for receipt, execution of data processing and/or other signal processes in accordance with the received instructions. Parsing of such instructions may include, for example, identifying the type of process(es) to be requested, including for example the amount of information content to be disseminated or distributed, the desired arrival times for the information content or a portion of the information content, preferable or enumerated routes for data to be routed, routing protocol to be taken, transport protocols to be used, volume or quantity of an order or bid for a trade or an amount of document processing to be done, and the type, nature, and/or identity (ies) of networked computing resource(s) 106 to be requested to receive or execute, and thereby associated with, a given data processing and/or other signal processing request.

For example, in order to increase the efficiency of signal and/or other data processing functions, router processor(s) 104 may parse, sort, and aggregate data, instructions or requests received from multiple sources 102 for relatively smaller execution requests into one or more larger requests for processing, and further divide such aggregated request(s) into pluralities of smaller requests to be distributed to plurality(ies) of execution processors 106, depending, for example, on the current ability of the execution processors 106 to satisfy or complete such processed requests.

For example, multiple instruction signal sets or content information signal sets received from different data sources 102a, 102b may be associated with (e.g., addressed for delivery to and/or execution by) individual networked computing resource(s) 106, and such instructions may be aggregated into single signal process instructions for such networked computing resource(s) 106. In some examples, identification of the networked computing resource(s) 106 to be tasked with a given signal processing request may be performed after the aggregating. For example, multiple instructions or information content from different data sources 102a, 102b may be sorted or otherwise associated with a single signal or data process, and such instructions may be aggregated, and the aggregated instructions may be associated with one or more identified networked computing resource(s) 106, such that one or more signal process requests may be accordingly prepared for the identified networked computing resource(s) 106. Such parsing, sorting, and/or identification may be performed according to predetermined rules or algorithms (e.g., based on continuing or current processing capabilities of one or more specific networked computing resource(s) 106), and according to requirements encoded in the instructions or otherwise provided by the originating source(s) 102, where relevant.

As a further example, single instruction sets for processing of data may be broken down by processor(s) 104 and distributed to a plurality of networked computer resource(s) 106. For example, a relatively large order for trading in one or more financial interests originating from a single source 102a, 102b, might need to be distributed to multiple exchange servers 106 in order to be completely filled; in such cases request(s) from one or more source(s) 102 may be broken down by processor(s) 104 into suitable orders for execution by a plurality of such resources 106.

In embodiments of system 100 adapted for the dissemination of market data and other information content, signal or data source(s) 102 can comprise servers and other devices useful for gathering, acquiring, modifying, generating, routing, and/or otherwise processing information content data sets comprising data representing market data, news items and other information. For example a business operating such a source 102 can comprise data processing and signal routing equipment adapted for the generation and dissemination of data sets representing market data or other information relating to the business. Similarly, source(s) 102 operated by governments and/or other entities can generate, gather, and/or otherwise process data representing market data, statistics, patterns, news, and/or other information affecting markets, businesses, and/or other social or economic matters. Like other source(s) 102, such source(s) can communicate with router processor(s) 104 and/or other processors via one or more public networks 108 (e.g., a public or private telecommunications network such as the internet), using suitable or otherwise desired network security devices, which may for example include data encryption, etc. In the example shown, router processor(s) 104 communicate with each of the one or more networked execution, or computing, resources 106 via a network 110, which may be the same as or different than network(s) 108.

In various embodiments, some or all of data source(s) 102 and router processor(s) 104 may be combined, and/or otherwise configured to implement multiple programming or other machine instruction applications running on single machines 102, 104.

In embodiments of the invention adapted for dissemination of market data and/or information content such as news and other information, networked computing resources 106 may include any devices or other resources that communicate with router processor(s) 104 to receive and interpret, or otherwise process, such information content data sets. These can include, for example, servers and other devices associated with brokers, dealers, and other financial interest traders; news services; government agencies, and/or any other entities which may wish to use, or otherwise have any interest in, such market data news or information.

In such embodiments, one or more data sources 102 can transmit or otherwise provide to or for router processor(s) 104 signals representing market data and/or information content such as news or other information content data sets, comprising for example data representing text, images, graphics, statistics, data, audio, video, or any other type of information. Information any given data source(s) 102 may include information of any type which may be of interest, or otherwise useful, to any one or more networked computing resources 106. Such data can further comprise addresses and/or other routing information or instructions useful for identifying resource(s) 106 and routing information data sets thereto.

The market data and/or information content may be provided as formatted, or unformatted data. The information may further be provided in a variety of formats, such as, but not limited to, extended markup language (XML), Microsoft Excel spreadsheets (XLS), comma separated values (CSV), text files (TXT), etc.

Router processor(s) 104 may parse information and/or instruction signal sets received from one or more source(s) 102 and use such signals to prepare information content data sets to be forwarded to pluralities of execution processors 106, for interpretation and/or other processing in accordance with routing instructions received with the content from source(s) 102 and/or otherwise accessed or generated by the routing processor(s) 104. For example, one or more mailing or routing lists may be maintained in memory 118, etc., associated with the routing processor(s) 106, and/or generated according to any suitable instructions or algorithms, received from or accessed from through any suitable source(s) 102, 1102, etc.

In all such embodiments, targeted, or specifically identified, networked computing resources 106 communicate with the router processor(s) 104 to receive the segmented signal process requests and may thereafter store, process, host, distribute or execute them accordingly.

As will be readily understood by those skilled in the relevant arts, various components of system 100 may combined, or may be implemented in the form of separate systems or devices. In a wide variety of configurations, such combined or separate (sub)systems may be operated by the same or distinct entities. As a particular example, one or more request source(s) 102 may be integrated with, or otherwise associated with, individual router(s) 104.

An example of an application of a system 100 for distributed execution of segmented processing requests in accordance with the invention is provided by a financial system 1000 adapted for processing of requests for processing of data representing trades and/or offers for trades, or other transactions, in tangible and/or intangible financial interests such as stocks, bonds, currencies (e.g., foreign exchange), various forms of natural resources or commodities, options, loans, etc. As shown in FIGS. 1A and 1B, for example, in a financial transaction data processing system 1000 in accordance with the invention, signal or data source(s) 102 may include trader system(s) 1102, which may, for example, include trader/broker systems or servers as well as any other sources of bids, offers, or other transactions in financial interests such as currently provided by known financial trading platforms. In various embodiments, such trader systems 1102 may be referred to as order origination systems.

Order origination systems 1102, 102*a* may include systems operated by or on behalf of, for example, entities owned or otherwise controlled by parent or other controlling organizations such as banks or brokerage houses. Order origination systems 1102, 102*b* may, for example, include systems operated by or on behalf of brokers or other trading entities acting on behalf of, for example, individual investors, trading through or with the assistance of independently-controlled banks, institutional investors, and/or other brokerage houses.

Router processor(s) 104 in such embodiments may include, for example, server(s) or other system(s) 1104 that communicate with trader systems 1102, 102, for example through the receipt and transmission of encoded electronic signals representing requests for processing of data representing execution and/or acknowledgement of transactions in financial interests; and which communicate with broker, exchange, or other market systems or execution processor(s) 1106 for execution of such transactions. In such embodiments a processor 104 may be referred to as a Smart Order Router or Tactical Hybrid Order Router (in either case, "SOR") 1104, 104. An SOR 1104 may, for example, include one or more gateway(s) 1122 and/or router(s) 1124 for facilitating communications by router(s) 1104 with one or more trader systems 1102, 102 directly (e.g., through wired communication, using one or more dedicated communication channel(s), or through communication within a single server) and/or indirectly (e.g., through wireless communication, through a network 108, 1108 or through an intermediate server). Exchange or market systems 1106, or other execution processor(s) 106 may be in communication with SOR(s) 1104 through, for example, a network 110, 1110, such as the internet or other public network, which may be the same as the network 1108.

For an embodiment of a system 100 configured as a financial trading or order execution system 1000, requested and executed signal processes provided by source(s) 102 may represent trades or other transactions in financial interests. Such transactions may include, for example, trades and/or offers for trades, or other transactions, in financial interests such as stocks, bonds, currencies (e.g., foreign exchange), various forms of natural resources or commodities, options, loans, etc.; and networked computing resources 106 may be, for example, exchange servers 1106, examples of which may include automatic or electronic market systems.

As will be well understood by those skilled in the relevant arts, an SOR (sub)system, or processor, 1104 receiving such transaction request signal sets can apply a wide variety of processes to the request(s). For example, where the signal sets represent requests for transactions in financial interests, requested transactions can be aggregated, either over time and/or across multiple transaction request sources 1102; and/or processing requests for transactions in one or more interests can be divided for routing to multiple execution handlers or processors 1106, individually or in batches.

In various embodiments, as described herein, order source(s) 102, 1102 can be implemented together with, or as part of, order router(s) 104, 1104. It will be readily understood by those skilled in the relevant arts that any or all of the various components of system(s) 100, 1000, including for example any or all of processor(s) 102, 104, 106, and methods of operating them in accordance with the disclosure herein, may be implemented using any devices, software, and/or firmware configured for the purposes disclosed herein. A wide variety of components, both hardware and software, as well as firmware, are now known that are suitable, when used singly and/or in various combinations, for implementing such systems, devices, and methods; doubtless others will hereafter be developed.

Figure 4:
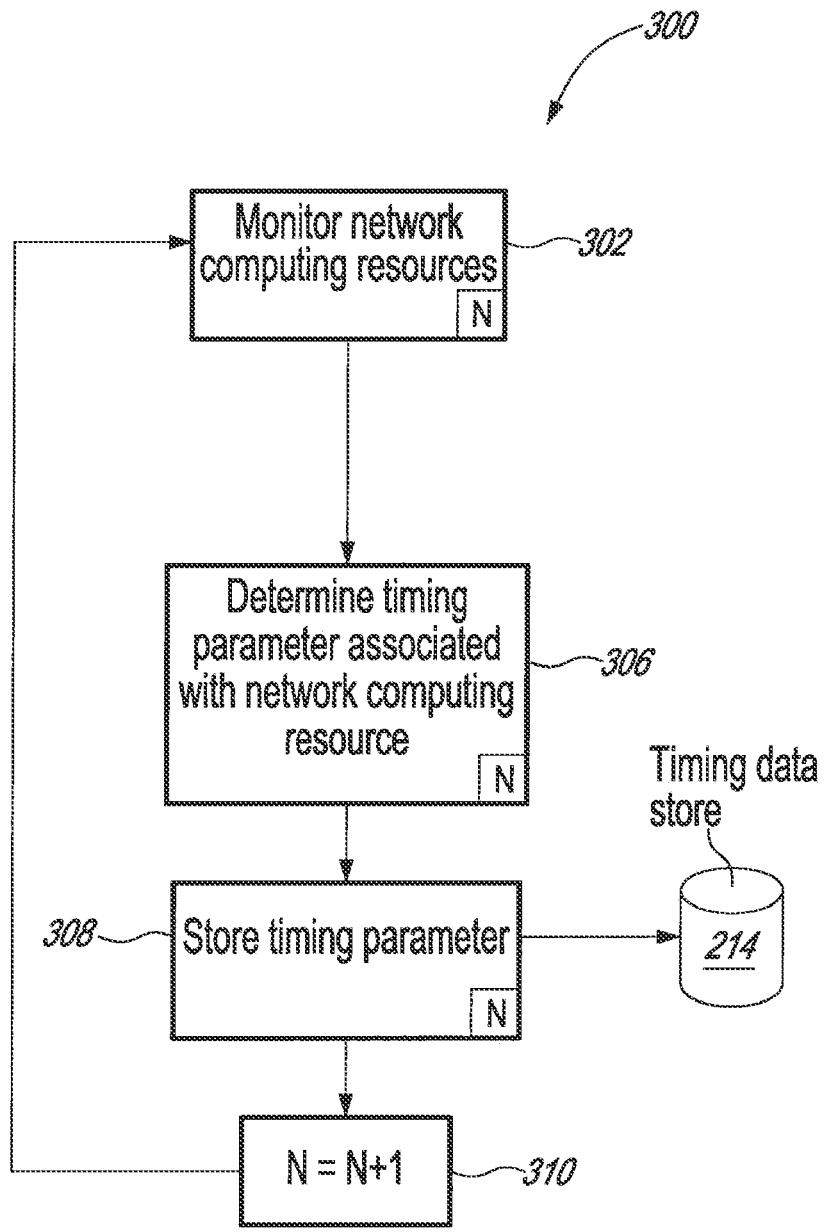

Examples of components suitable for use in implementing examples of systems 100, 1000, and the various processes disclosed herein, including for example processes 200 of FIG. 2 and 300 of FIG. 4, include, for example server-class systems such as the IBM x3850 M2™, the HP ProLiant DL380 G5™ HP ProLiant DL585™, and HP ProLiant DL585 G1™. A wide variety of other processors, including in some embodiments desktop, laptop, or palm model systems will serve.

An example of a method 200 for processing of a transaction request signal set generated by a transaction request signal source 102, 1102, suitable for implementation by an router processor(s) 104 such as, for example, an SOR 1104 of a system 1000, is shown in FIG. 2.

Process 200 of FIG. 2 can be considered to start at 202, with receipt by processor(s) 104, 1104 of signals representing a request for processing of data such as, for example, a transaction in one or more financial interests. In embodiments of systems 100, 1000 comprising SOR routing processor(s) 1104 adapted to process signals representing requests for execution of trades and/or other transactions in financial interests received from transaction signal source(s) 1102, signal sets representing requests for execution of transactions in one or more financial interests can include signals or signal sets representing, for example, one or more identifiers representing:

the source(s) of the request, such as a uniform resource locator (URL) or other network address or identifier used by or otherwise associated with a trading system 102, 1102;

the interest(s) to be traded or otherwise transacted, such as an identifier used by one or more exchanges to identify a stock, a CUSIP number for a bond, a set of currencies to be exchanged, etc.;

a type of transaction (e.g., buy, sell, bid, offer, etc.) to be executed or requested;

one or more quantities (i.e., amounts or volumes) of the interest(s) to be transacted (including for example any total and/or reserve quantities); and corresponding price terms.

Further parameters can include, for example, current and/or historical:

fill probability for multi-part, or segmented, transaction requests (i.e., the historical proportion of multi-part orders that result in completed transactions);

amounts of spread between, for example, bid and offer prices, e.g., current and/or relative to historical trends in spread;

market volatility in specific interests to be traded, or related or corresponding interest(s), or related benchmarks or indexes;

depth of market book(s), for example current depth relative to historical trends in depth;

reserve quantities;

display quantities; and display size and backing, for example on buy and/or sell sides.

In other embodiments, such signal sets can comprise content and/or identifiers representing images, text, or other content or to be processed by one or more execution processors 104, 1104, and specific execution requests.

Among the many types of market systems 1106 suitable with various embodiments of the invention are alternative trading systems (ATSs) of the type known as 'dark' exchanges, or 'dark pools'. Typically, such exchanges do not openly display market offerings to members of the trading public. The use of known or predicted reserve quantities can be especially useful in such embodiments.

Thus an example of a data record to be provided by a source 102, 1102 to request a transaction in a given interest, on stated terms, can include:

<source (102, 1102) of request><type of transaction><interest identifier><quantity(ies)><price term(s)>

Signal sets received by processors 104, 1104 at 202 can be stored in any volatile and/or persistent memory(ies), as appropriate, for archival and/or further processing purposes.

At 204, transaction or other data processing execution requests received at 202 can be parsed by router processor(s) 104, 1104 to place them in any suitable or desired form for use in preparing one or more instruction signal sets to be provided to execution processor(s) 106, 1106. Parsing of instruction signals may include, for example, identifying the type of transaction(s) or process(es) to be requested, including for example volumes and/or quantities of orders or bids for trades in specified interest(s), and whether such volumes are to be bought or sold, or offered for sale or purchase; amounts and/or types of document processing to be done; and the type and nature of networked computing resource(s) or execution processor(s) 106 to be requested to execute and thereby be associated with such execution or processing instructions. In various embodiments parsed instruction sets can be stored in temporary or volatile memory(ies) 118, 1018 accessible by the corresponding processor(s) 104, 1104 for aggregation with other processing requests, division for routing to multiple execution processors/resources 106, 1106, and/or preparation and forwarding of batch or other delayed-execution requests.

Instructions received at 202 may be accumulated during defined time intervals, regular or irregular, such as the duration of a business day or any segment thereof, or any other desired time period(s), which may be preset and/or dynamically determined by processor(s) 104, 1104. Instructions may be also be processed individually, as received. If more instructions are to be received prior to processing, or may potentially be received, process 200 can return to 202.

Transaction requests/instructions may be accumulated during defined time intervals, such as the duration of a business day or any segment thereof, or a desired time period, which may be preset and/or dynamically determined by processor(s) 104, 1104. If more instructions to be received, or may potentially be received, process 200 can return to 202.

In embodiments of the invention which employ sorting/aggregation techniques in parsing or otherwise preparing order or other processing requests, at 206 processor(s) 104, 1104 can repeat process 202-204 until all needed or desired related or aggregatable processing request signal sets have been received from source(s) 102, 1102. For example, as described above, arbitrary numbers of data records representing orders or requests for purchase of bonds identifiable by CUSIP (Committee on Uniform Security Identification Procedures) numbers can be received from data source(s) 102, 1102, and stored in memory 118, 1018 associated with the processor(s) 104, 1104, for batch processing, thus:

<source 1><sell><CUSIP No. AA><10,000><price A><res. 9,000><price D>
    <source 2><buy><CUSIP No. BB><12,000><price C><res. 1,000><price B>
    <source 3><sell><CUSIP No. BB><11,000><price A><res. 8,000><price D>
    <source 6><sell><CUSIP No. AA><14,000><price A><res. 2,000><price E>
    <source 4><buy><CUSIP No. AA><18,000><price C><res. 7,000><price B>
    <source 1><sell><CUSIP No. BB><20,000><price A><res. 3,000><price D>
    <source 3><sell><CUSIP No. AA><13,000><price A><res. 6,000><price D>
    <source 4><buy><CUSIP No. BB><22,000><price C><res. 4,000><price B>
    <source 5><sell><CUSIP No. AA><21,000><price A><res. 5,000><price E>
    <source 4><buy><CUSIP No. BB><15,000><price C><res. 7,000><price F>
    <source 1><sell><CUSIP No. AA><19,000><price A><res. 3,000><price D>
    <source 5><buy><CUSIP No. BB><16,000><price C><res. 8,000><price F>
    <source 6><sell><CUSIP No. BB><17,000><price A><res. 6,000><price H>

Upon individual receipt, or at a given periodic rate, a given time, when a given number of orders has been received, when all desired orders have been received, or when any other desired criteria have been satisfied, processor(s) 104, 1104 can, as a part of parsing or otherwise processing instructions at 204, sort and/or group the stored records according to any one or more desired criteria, e.g., by type of transaction request and interest identifier, thus:

<buy><CUSIP No. AA><18,000><price C><res. 7,000><price G><source 4>
    <sell><CUSIP No. AA><10,000><price A><res. 9,000><price D><source 1>
    <sell><CUSIP No. AA><14,000><price A><res. 2,000><price E><source 6>
    <sell><CUSIP No. AA><13,000><price A><res. 6,000><price D><source 3>
    <sell><CUSIP No. AA><21,000><price A><res. 5,000><price E><source 5>
    <sell><CUSIP No. AA><19,000><price A><res. 3,000><price D><source 1>
    <buy><CUSIP No. BB><15,000><price C><res. 7,000><price F><source 4>
    <buy><CUSIP No. BB><22,000><price C><res. 4,000><price B><source 4>
    <buy><CUSIP No. BB><12,000><price C><res. 1,000><price B><source 2>
    <buy><CUSIP No. BB><16,000><price C><res. 8,000><price F><source 5>
    <sell><CUSIP No. BB><20,000><price A><res. 3,000><price D><source 1>
    <sell><CUSIP No. BB><11,000><price A><res. 8,000><price D><source 3>
    <sell><CUSIP No. BB><17,000><price A><res. 6,000><price H><source 6>

As shown, various data fields in the transaction request records can be reordered or otherwise reformatted as needed or desired, to suit the processing needs of the routing processor(s) 104, 1104. For example, as shown, the association of a "source" data item associated with or otherwise accorded a different priority, to facilitate efficient ordering while permitting the processor(s) 104, 1104 to report fulfillment of transactions/requests on completion of order processing.

Process 204 can further include aggregation by processor(s) 104, 1104 of received and sorted transaction requests, into collected or consolidated order(s) for specific types of transactions in specific interest(s), e.g., by summing total or subtotal quantities associated with corresponding transaction requests, thus:

<buy><CUSIP No. AA><18,000><price C><res. 7,000><price G>
    <sell><CUSIP No. AA><77,000><price A><res. 18,000><price D><res. 7,000><price E>
    <buy><CUSIP No. BB><65,000><price C><res. 15,000><price E><res. 5,000><price B>
    <sell><CUSIP No. BB><48,000><price A><res. 11,000><price D><res. 6,000><price H>

When all desired signal sets have been received at 202, and optionally sorted, accumulated, and/or otherwise processed at 204, at 208 processor(s) 104, 1104, using instruction sets processed at 204, can prepare execution-request signal sets for transmission to resources/execution processors 106, 1106. Such execution-request signal sets can comprise any necessary or desirable signals for causing requested processing, including content or data and command signals. For example, in embodiments of the invention adapted for processing of requests for transactions in financial interests, requests may be sorted and/or aggregated on the basis of interest(s) to be traded, quantities of interest(s) to be traded, price, etc., and associated with suitable execution command signals. The form of any execution command signals associated with a given request can depend, as those skilled in the relevant arts will recognize, on the nature and type of requests to be executed and the processors 106, 1106 by which they are to be executed, as well any networks 110, 1110 over which signals exchanged between processor(s) 104, 1104 and 106, 1106 are to be sent, including applicable protocols and instruction formatting requirements. Ergo, data pertaining to any or all of systems 106, 1106, 104, 1104, and 110, 1110, protocols used thereby, and/or information related to interests traded, offered, or described thereby may be accessed and used by processor(s) 104, 1104 in parsing and preparing instructions for execution of processing by any of processors or resources 106, 1106. Sources 1126 of such data may include, for example, exchange market data system 1126v (FIG. 1b) which, for example, in embodiments of the invention adapted for processing of financial transactions, can include information received from various exchange systems 1106, news information sources such as Bloomberg or Reuters, and/or other sources.

It is sometimes necessary or desirable, in assembling requests for data processing using networked processing resources, including many resources configured for use in executing financial transactions, to break execution and/or other processing requests into multiple parts. Such parts, or segments, can, for example, correspond to portions of larger orders or other data processing requests, to be executed by a plurality of networked resources 106 such as exchange servers or other execution processor or handlers 1106. For example, if a plurality of exchange servers or other markets are available for execution of a transaction request representing a purchase order for a significant amount of a financial interest such as a stock or bond, it may be necessary or desirable to split the order into multiple parts, for execution in multiple markets and/or by multiple exchange servers 1106. For example, sufficient quantities of specific interests may not be available, at all or at desirable prices, on a single exchange: in order to fill an order entirely, it may be necessary or desirable to break a single order into smaller segments and route it to multiple exchanges.

Thus, for example, in various embodiments of the invention directed toward the processing of requests for transactions in financial instruments, when a router 104, 1104 is requested by one or more sources 106, 1106 to complete a transaction in one or more financial interests, the router 104, 1104 can, in preparing signal set(s) representing requests for the transactions, access information available from sources such as market data source(s) 1126, as well as any one or more execution processor(s) 106, 1106, to determine the quantities of such interests available through the respective processors 106, 1106 and the terms under which such quantities are available, and can construct an execution request signal set configured for routing to each of the respective desired processors 1106, 1106, based on the number of quantities available at the most favorable terms.

For example, continuing the example above, it may be necessary or desirable to split one or more incoming processing requests into smaller parts, directed to a plurality of exchanges, in order to obtain fulfillment of the complete order(s). This can be accomplished by, for example, accessing data representing current order books provided by one or more of exchange servers 1106 and dividing the order(s) correspondingly, using known data processing techniques. Thus, for example, the aggregated 'sell CUSIP No. AA' order above may be broken down into portions or segments and associating with data representing such segments URLs or other network resource address identifiers suitable for use in routing the various segments to a plurality of exchange servers A1-C3, as desired, thus:

<exchange A1><sell><CUSIP No. AA><15,000><price A><res. 6,000><price D><res. 2,000><price E>
    <exchange B2><sell><CUSIP No. AA><27,000><price A><res. 6,000><price D><res. 2,500><price E>
    <exchange C3><sell><CUSIP No. AA><35,000><price A><res. 6,000><price D><res. 2,500><price E>

As will be appreciated by those skilled in the relevant arts, execution of individual portions of a distributed transaction or other multi-part data processing request such as a transaction in financial interests placed in multiple exchanges by a plurality of network resources, such as market or exchanger servers 1106 or other execution processors 106, typically requires different amounts of time. That is, if multiple parts of a desired transaction execution request are sent simultaneously to a plurality of exchange execution processors 106, 1106, each part or segment of the transaction request may be expected to execute at a different point in time. This is because the amount of time, or 'latency,' required for transmission of execution request signals from the order router(s) 104, 1104 to the different various resources or execution processor 106, 1106 across a network 110, 1110 or other communications path; for actual processing of corresponding portions of the execution request by the corresponding processors 106, 1106; and/or for return of confirmatory or other data to the order router(s) 104, 1104 typically varies depending upon a number of factors, including for example the network paths between the router(s) 104, 1104 and execution processors 106, 1106; the amount of network traffic being processed by the network(s) 110, 1110; the number of requests being handled by the individual execution processors 106, 1106, etc.

For a number of reasons it can be important, in such cases, to synchronize execution of two or more portions of a multi-part execution request. As one example, when an execution request represents a request for execution of multiple parts of a financial transaction in multiple markets or on multiple exchanges, non-synchronized, staggered execution of individual portions of the transaction by multiple corresponding servers can affect both the possibility of completing later portions of the transaction and/or the terms under which such later portions may be completed.

A particular example of the desirability of synchronizing execution requests may be illustrated through reference to FIG. 3. In the example shown in FIG. 3, system 100, 1000 comprises order router 104, 1104 and a plurality of networked execution resources 106, exchange servers or execution processors 1106 "Exchange 1," "Exchange 2," "Exchange 3." In addition, system 100, 1000 of FIG. 3 further comprises a co-located trading server 304 configured to execute trades or other transactions on execution resource 1106 "Exchange 1." As noted in the Figure, co-located trading server 304, which employs a relatively low-latency trading algorithm, is associated with Exchange 1 in such manner that it can execute transactions with Exchange 1 in a relatively short period of time compared to the amount of time required for other processors, such as router(s) 104, 1104, to complete similar transactions with Exchange 1. For example, co-located server 304 can be communicatively linked with Exchange 1 by direct wireline connection, or other rapid-processing system. Moreover, Exchange 1 is capable of completing an execution request with non co-located processor(s) 104, 1104 in a relatively shorter period of time (i.e., with a "lower latency") than is either Exchange 2 or Exchange 3. In other words, as shown in FIG. 3, latency Time X<Time Y and Time X<Time Z, while an execution time for a transaction between co-located server 304 and Exchange 1 is less than any of Time X, Time Y, and Time Z.

If, for example, signals representing a request to trade in one or more financial interests is received by a router processor 104, 1104 from one or more request sources 102, 1102, and the request is of such quantity or magnitude that an order reflecting the request will be too large to be completely filled by any one of Exchanges 1, 2, or 3, the order router 104, 1104 may attempt to check availabilities on the various available processors 106, 1106 and split the order accordingly, in order to route a portion of it to each of Exchange 1, Exchange 2, and Exchange 3. If the router 104, 1104 of FIG. 3 simultaneously transmits to each of execution processors 106, 1106 Exchange 1, Exchange 2, and Exchange 3 a divided portion or segment of the request for execution of the requested transaction, it is possible that trading server 304 (which might, for example, be operated by a high-frequency trading entity, or other speculative investor) will be able fill a portion of that transaction on Exchange 1 by, for example, acting as a counterparty to the proposed transaction by selling or buying all or a portion of the transaction request forwarded to that exchange by the order router 104, at terms stated in the request for the transaction, and have time in which to change or otherwise post terms for filling remaining portions of the order on Exchange 2 and/or Exchange 3, on terms more favorable to the party making the transaction(s) available (e.g., the party operating or acting through the server 304) than those offering such transactions (e.g., those behind orders provided by request processor(s) 104, 1104) might otherwise have sought. In other words, for example, the co-located trading server 304 may, due to the difference in execution latencies associated with trades with Exchange 1, Exchange 2, and Exchange 3, be able fill a portion of the requested transaction on Exchange 1 and move to improve its terms, by for example raising or lowering its bid/offered price, for filling remaining portions of the transaction on Exchange 2 or Exchange 3 before such remaining portions can execute at previously-stated prices, in order to increase its operators' or beneficiary(ies) own profits, or the profits of other traders offering similar interests on those Exchanges.

As may be seen in FIG. 3, such possibilities (which can be referred to as 'latency arbitrage' opportunities) can exist when:

$$\text{Time } X + \text{Time } A < \text{Time } Y \text{ and/or}$$

$$\text{Time } X + \text{Time } B < \text{Time } Z$$

It will be appreciated by those skilled in the relevant arts that, even where transaction or other processing request signals are sent simultaneously to each of Exchanges 1, 2, 3 from the router(s) 104, 1104, the time required for each divided portion of the request to be received, acknowledged, and/or processed by the respective resources 106, 1106 (e.g., Times X, Y, Z) may in general be different, for example due to differences in network communications paths and processing speeds in any or all of processor(s) 104, 1104 and/or 106, 1106. Similarly, the time required for trading server 304 to change terms of transaction offerings in each of Exchanges 2 and 3 may in general differ.

Among the disadvantages which can arise in such cases is that traders represented by request source(s) 102, 1102 may pay higher prices in executing their trades than they otherwise would have, in the absence of such arbitrage opportunities; or, if prices on subsequent exchanges are changed sufficiently to put them outside terms stated in their execution requests, they may not be able to complete transactions in desired quantities—for example, all or part of a transaction routed to an exchange processor 1106 may not trade in view of a changed price.

In such examples, in which a trade instruction may not be fully fulfilled at an exchange server 1106 due for example to price or other term manipulation by a third party taking advantage of latencies, in prosecuting data processing requests in one or more exchange servers 1106 it may be useful to time or schedule the sending of trade requests to multiple exchange servers 1106 such that the execution of such trade requests at all exchange servers 1106 happens in a synchronized manner, such as, for example, in a substantially concurrent manner. In particular, it may be useful to synchronize the execution of signal processing execution requests, or portions or segments thereof, in multiple networked computing resources 106, 1106, for example such that the signal processes are received, acknowledged, and/or executed by the resources 106, 1106 in a substantially concurrent manner.

In some examples it may not be necessary for the signal processes to be executed in each processor 106, 1106 to be executed simultaneously, but may be sufficient that:

$$\text{Time } Y - \text{Time } X < \text{Time } A, \text{ and/or}$$

$$\text{Time } Z - \text{Time } X < \text{Time } B,$$

such that execution of the request(s) or segments thereof occurs before any change in terms can be implemented by a trading server 304. The use of such synchronized timings can, for example, cause:

$$\text{Time } X + \text{Time } A > \text{Time } Y \text{ and/or}$$

$$\text{Time } X + \text{Time } B > \text{Time } Z$$

and thus, for example, defeat latency arbitrage opportunities. In some embodiments, therefore, the invention provides router(s) 104, 1104 the ability to execute transactions across multiple resources 106, 1106 with minimal or no time variance, such that algorithms run by trader(s) 304 employing low-latency algorithms are given insufficient time to react to market changes.

Thus, in these and other cases where synchronization is desired, at 210 processor/router 104, 1104 can determine absolute or relative timings to be assigned to, or otherwise associated with, various portions or segments of an execution request, in order to obtain the desired sequencing. Such timings can be determined in order to cause any desired synchronization: for example, timings configured to cause simultaneous, or substantially simultaneous, execution can be determined, or timings configured to cause any desired sequencing can be determined.

Thus at 210, a timing parameter can be determined for each signal processing execution request, or portion thereof, to be assigned to each respective networked computing resource 106, 1106. The parameters are determined in such manner as to cause synchronized execution of the signal processing execution requests at each of the respective networked computing resources 106, 1106. This determination can be based at least partly on a corresponding determined latency in the execution time of such request(s) and/or portion(s), such as for example any or all of latencies A, B, X, Y, Z of FIG. 3, and/or any other relevant latencies, in the execution of signal exchanges between the router processor(s) 104, 1104 and each of the networked computing resources 106, 1106, or in the processing of other such signals by any of such devices.

Arbitrage and other problems caused by variations in execution time between servers can also be minimized or eliminated by reducing absolute latencies in transmission and execution of processing requests. Thus the determination of timing parameters as described above can be practiced in combination with procedures which also serve to minimize absolute amounts of time associated with execution and/or reporting of execution requests by resource(s) 106, 1106.

Information on determined latencies used in determining timing parameters to be associated with the various portions of a multi-part execution request provided by router(s) 104, 1104 to a plurality of execution processors 106, 1106 may include timing information (e.g., transmission delays, signal propagation delays, serialization delays, queuing delays, and/or other processing delays at the router processor(s) 104,

1104, the networked computing resource 106, 1106, and/or network(s) 110, 1110, 108, 1108). Such information may be provided by or received from any source(s), and may be stored in and retrieved from one or more data stores 214. Timing data store(s) 214, in various embodiments, may include databases or other data structures residing in memory(ies) 118, 1018 associated with or otherwise accessible by router processor(s) 104, 1104. For example, if execution of a portion of an execution request associated with a first networked computing resource 106, 1106 has a longer determined latency than that associated with a second networked computing resource 106, 1106 (as for example in the case of Exchange 1 vs. Exchanges 2 and 3 of FIG. 3) timing for requests associated portions of a transaction request to be routed to these two networked computing resources 106, 1106 may be determined such that an execution request, or portion thereof, associated with the first networked computing resource 106 is timed to be sent earlier than the request associated with the second networked computing resource 106, with the aim of having the requests executed at the two networked computing resources 106 substantially concurrently, or within an effective minimum time A or B associated with possible term manipulation by a trading server 304.

In some embodiments, one or more algorithms, which may for example use a latency probability model or other predictive model, may be used in determining timing parameters to be associated with portions of execution requests to be routed to various execution processors 106, 1106, based on information associated with such communication and/or processing delays, or latencies. For example, a rolling average of historical latency data, accumulated over or relevant to any desired devices, time periods, or other timing considerations may be used to predict an expected latency for execution of a data processing request.

One example of an algorithm suitable for use in determining timing parameters to be associated by router(s) 104, 1104 with portion(s) of requests for execution provided by source(s) 102, 1102, where it is desired to cause concurrent or otherwise synchronized arrival of such portions or requests at network resources 106, 1106, is based on an average latency between transmission of request signals from router(s) 104, 1104 and an appropriate timing reference. Such timing reference(s) can for example include start of processing by the corresponding targeted resource(s) 106, 1106, and/or receipt by routing processor(s) 104, 1104 of a confirmation signal generated by the resource(s) 106, 1106 on receipt of the request and/or completion of execution of the request. For example, in some embodiments, it can be advantageous to measure latencies between transmission to a given resource 106, 1106 and receipt by the router(s) 104, 1104 of a confirmation or acknowledgement signal, or other appropriate response signal 1260, from such resource 106, 1106, and to use such measured latency(ies) in determining timing parameter(s) at 210.

Process step 210 may for example be carried out by an application executed by, or a module of, or otherwise associated with, routing processor(s) 104, 1104 such as a capital management entity or module 1126 in the case of a financial system 1000. Determination of a timing parameter to be associated with each part or segment of a multi-part execution request may, for example, include use of an adaptive exchange round-trip latency (RTL) learning & compensation logic module 1126c, such as that shown in Figure FIG. 1B. Referring to FIG. 3, such an adaptive exchange RTL learning & compensation logic module 1126c may determine the timing for each signal processing request (e.g., a trade request) as follows:

1) For each portion or segment n of an m-part multi-part processing request X, a time $T1_{x,n}$ provided by, for example, a clock associated with the processor(s) 104, 1104 is time-stamped by processor(s) 104, 1104 at a desired defined point within the process of parsing or generating the transaction order(s), or other processing request(s) X, and is associated with a processing request signal set record(s) corresponding to each part or segment n of the m-part request X.

2) $T2_{x,n}$ for each portion n of the multi-part request X is time-stamped by the processor(s) 104, 1104 when the corresponding $n^{th}$ portion request signal set has been received at the targeted exchange 106, 1106, and a corresponding exchange-generated confirmation message has been received by the requesting routing processor 104, 1104.

3) During the course of a trading day (or other data processing period), process steps 2 and 3 may be repeated, and corresponding $T1_{x,n}$ and $T2_{x,n}$ determined for each transaction segment routed to a given execution processor 106, 1106.

4) For each portion segment n of a subsequent pending multi-part execution request Y, the determined timing parameter $RTL_{y,n} = \Sigma(T2_{x,n} - T1_{x,n})/Z$, where Z is the number of previously-executed order segments routed to a given execution processor 106, 1106 used in the calculation.

Where timing data store(s) 214 store a rolling record of past timing parameters (e.g., a plurality of determined timing parameters $RTL_{y,n}$) associated with one or more execution resources 106/exchange server 1106, such data may be used to create a rolling histogram, which may be used to predict current or cumulative latency for each resource 106/exchange server 1106. Because such predictions are based on a continuously-changing ("rolling") record, this process may be referred to as "online learning." There may be a component (e.g., an exchange latency histogram memory or processing component, not shown) within the adaptive exchange RTL learning & compensation logic module 1126c responsible for this.

An adaptive exchange RTL learning & compensation logic module 1126c may use predicted latencies to determine appropriate timing parameters to be used in transmitting trade (or other data processing) requests to various exchange servers 1106 in order to compensate for differences in execution latencies associated with such exchange servers 1106, in a way that reduces, controls, minimizes or eliminates differences in timing of execution of portions of divided trade requests routed to different exchange servers 1106, and thus, for example, reduces or eliminates opportunities for latency arbitrage by opportunistic traders.

Adaptive RTL module(s) 1126c can use a variety of algorithms in determining timing parameters suitable for use in synchronizing execution of multi-part processing requests. For example, such a module may use latency values determined for the various exchanges to determine the extent to which the router(s) 104, 1104 should compensate for different exchange latencies by sending to the various processors 106, 1106 their corresponding portions of a request for processing at, for example, different times. This can minimize delay between completion of execution of each portion by, for example, minimizing the difference in time between receipt of each respective portion by its corresponding execution resource 106, 1106. (In FIG. 3, for example, this would be shown as minimizing differences between times elapsed at Time X, Time Y and Time Z.) Such algorithms can also account for historical differences in the time required for execution of trade or other processing orders on the various resources 106, 1106, in addition to communication delays.

Adaptive exchange RTL learning & compensation logic module(s) 1126c may additionally collect information about market conditions prevailing in each exchange server 1106 (using, for example, sources of data such as exchange market data source(s) 1126v), wave orders/executions, actual latencies and target latencies (e.g., as predicted above) when trade requests are sent. There may be a component within the adaptive exchange RTL learning & compensation logic module 1126c responsible for this.

One or more timing parameters associated with execution requests to be routed to any one or more of execution processor(s) 106, 1106 can also be provided to the corresponding routing processor(s) 104, 1104 (e.g., to timing data store 214) by, or determined by such processor(s) 104, 1104 using related data supplied by, any one or more market data feed(s) or processor(s) 1126 (including e.g., any one or more of processors or (sub)systems 1126a-1126g and/or 1126v), and/or by processor(s) 106, 1106 themselves.

At 212, the various portions of the optionally aggregated and divided signal processing execution request(s) are sent to the respective networked computing resources 106 according to timing parameters or sequence(s) determined or otherwise acquired at 210. Thereafter the request(s), or the various portions thereof, may be executed by the respective execution resources 106, 1106, with subsequent signal communications and processing as needed or desired. As will be understood by those skilled in the relevant arts, once they have been made familiar with this disclosure, once the parameters of a desired execution request have been determined by router(s) 104, 1104, signals representing those parameters may be assembled, using known or specialized data processing techniques; formatted according to the Financial Information Exchange (FIX) protocol and/or any other desired protocol(s); and transmitted, written or otherwise communicated to the corresponding execution processor(s) 106, 1106 using known or specialized signal communications techniques, and executed in accordance with requested transaction or other data processes.

For example, continuing the example above, timing delays, or parameters X', Y', Z', one or all of which may be equal to zero or any other suitable time period, may be determined according the disclosure above and associated with the order segments generated by processor(s) 1104 for purchase of 77,000 bond lots of CUSIP No. AA bonds at price A, with 25,000 lots (18,000+7,000) in reserve at prices D and E, respectively, thus:

<delay X'><exchange A1><sell><CUSIP No. AA><15,000><price A><res. 6,000><price D><res. 2,000><price E>

<delay Y'><exchange B2><sell><CUSIP No. AA><27,000><price A><res. 6,000><price D><res. 2,500><price E>

<delay Z'><exchange C3><sell><CUSIP No. AA><35,000><price A><res. 6,000><price D><res. 2,500><price E>

Thereafter, routing processor(s) 104, 1104 can process the transaction segments by using timing parameters, e.g., delays X', Y', Z', to cause the corresponding transaction segments to be transmitted or otherwise provided to the exchanges 106, 1106 A1, B2, C3 for execution according to a desired timing sequence, for simultaneous or otherwise-desired sequential execution.

Following execution of all or as many portions of routed transaction or processing segments, routing processor(s) 104, 1104 can receive from corresponding execution processor(s) 106, 1106 data confirming or otherwise indicating such execution, and by accessing data records stored in associated memory(ies), can allocate execution results to the requesting source(s) 102, 1102.

An example of a method 200 for synchronized dissemination of market data and/or information content data generated by one or more information signal sources 102, 1102, suitable for implementation by a router processor(s) 104 such as may also be described by reference to FIG. 2.

In such embodiment(s) a process 200 of FIG. 2 can be considered to start at 202, with receipt by processor(s) 104, 1104 of signals representing one or more market data and/or information content data sets, such as one or more market data information items generated by source(s) 102, to be disseminated to one or more networked resources 106, such as client display, reading, and/or automated analysis systems. In various embodiments, data set(s) received at 200 can also comprise routing instruction data, such as addresses or other identifiers associated with one or more networked target recipient resource(s) 106, and optionally data representing any preferred timing, sequence, and/or synchronization instructions.

Such signal sets can, for example, comprise one or more identifiers representing any one or more of any of the following:

the source(s) of the request, such as a URL or other network address or identifier used by or otherwise associated with an information source system 102;

market data and/or information content, such as text, images, graphics, video, or audio content;

pointers to market data and/or information content, such as URLs or other address information useable by client networked resource(s) 106 in accessing such market data and/or information content in form stored on networked memory(ies);

type(s) of market data and/or information content comprised by the content data set(s); and/or one or more targeted or intended recipient resource(s) 106;

various header information/metadata providing information relevant to the data set, and/or intended timing, delay, synchronization or staging information to be used, for example, in controlling delivery to one or more pluralities of recipient system(s) 106.

Thus an example of a content data record, or set, to be provided by a source 102, 1102 to a router 104 for dissemination to one or more recipient system(s) 106 can include:

<source (102) of information><type of information><content data><recipient identifier(s)><priority><absolute or relative timing requests>

For example, such a content data set can comprise an identifier of a market data and/or information content source; an identifier indicating that the routed content relates to a financial information; the content to be routed (or a pointer to an address at which such content may be accessed); a high, medium, or low priority; a plurality of classes of recipients (such as first, second, and third tier); and a date and time prior to which the market data and/or information content is not to be released, such as the end of a corporation's reporting period. For example, the classes of recipients may relate to tiers of subscribers to market information, wherein the system of the present invention is used to synchronize the release of market information within a tier of subscribers. Signal sets received by processors 104,

1104 at 202 can be stored in any volatile and/or persistent memory(ies), as appropriate, for archival and/or further processing purposes.

At 204, market data and/or information content distribution requests received at 202 can be parsed by router processor(s) 104, 1104 to place them in any suitable or desired form for routing to networked target or recipient processor(s) 106, 1106. Parsing of instruction signals may include, for example, identifying the type of information to be disseminated; the amount of content, e.g., the number of bits or characters in the information content data set; one or more recipient(s), or classes of recipients, to whom the information is to be routed; and whether such information is to be disseminated to one or more classes of recipient(s) 106 in one or more stages, such as according to one or more absolute date/time or relative timing schedule(s). In various embodiments parsed instruction sets can be stored in temporary or volatile memory(ies) 118, 1018 accessible by the corresponding processor(s) 104, 1104 for aggregation with other processing requests, division for routing to multiple networked computing resources 106, 1106, and/or preparation and forwarding of batch or other delayed-distribution.

Market data and/or information received at 202 may be accumulated and/or aggregated during defined time intervals, regular or irregular, such as the duration of a business day, month, quarter, or any segment thereof, or any other desired time period(s), which may be preset and/or dynamically determined by processor(s) 104, 1104. Instruction for routing of information may be also be processed individually, as received. If more market data and/or information data sets are to be received prior to routing, or may potentially be received, process 200 can return to 202.

Distributions/instructions may be accumulated during defined time intervals, such as the duration of a business day or any segment thereof, or a desired time period, which may be preset and/or dynamically determined by processor(s) 104, 1104. If more instructions to be received, or may potentially be received, process 200 can return to 202.

Any or all routing information to be used by router(s) 104 in disseminating market data and/or information content received from source(s) 102 can be provided by either or both of source(s) 102 and router(s) 104 (which may in various embodiments be the same device), using list(s) generated in real time, stored previously, or both. Of course, as will be immediately understood by those skilled in the relevant arts, once they have been made familiar with this disclosure, router(s) 104 and source(s) 102 can in many applications be combined, or, to look at it another way, functions described herein in connection with both can be provided by a single device, or processor, or associated system(s).

When all desired information data set(s) have been received, or when any other desired criteria have been satisfied and a router 104 is ready to disseminate information, at 208 router(s) 204 can generate a set of desired recipient identifiers. For example, a recipient identifier data set can be generated as follows:

<recipient class 1><recipient 1A><release time 1>
<recipient class 1><recipient 1B><release time 1>
<recipient class 1><recipient 1C><release time 1>
<recipient class 2><recipient 2A><release time 2>
<recipient class 2><recipient 2B><release time 2>
<recipient class 2><recipient 2C><release time 2>
<recipient class 3><recipient 3A><release time 3>
<recipient class 3><recipient 3B><release time 3>
<recipient class 3><recipient 3C><release time 3>
<recipient class 3><recipient 3D><release time 3>

As previously noted, routing of information and other forms of data processing instruction sets, or requests, from router(s) 104 to recipient system(s) 106 requires different amounts of time, due to differences in 'latency,' required for transmission of signals representing information content data sets from the router(s) 104, 1104 to the different various resources or networked computing resource 106, 1106 across a network 110, 1110 or other communications path; for actual processing of corresponding portions of the desired distribution by the corresponding processors 106, 1106; and/or for return of confirmatory or other data to the router(s) 104, 1104 typically varies depending upon a number of factors, including for example the network paths between the router(s) 104, 1104 and networked computing resources 106, 1106; the amount of network traffic being processed by the network(s) 110, 1110; the number of requests being handled by the individual networked computing resource 106, 1106; the length of the information content data set(s) to be disseminated, etc.

As for example discussed above, for a number of reasons it can be important to synchronize delivery or distribution of market data and/or other information content to multiple recipient data processors 106. As one example, when market data and/or an information release may be expected to affect the prices of openly traded commodities, or interests, and particularly when such interests are traded electronically, it can be important to ensure that information is released simultaneously, or in other synchronized fashion to all traders; and it can be important that such information not be released, or otherwise made available, directly or indirectly, to any one or more such traders prior to a given date and/or time.

Thus at 210, one or more timing parameters can be determined for each distribution, or portion thereof, to be assigned to each respective networked computing resource 106, 1106. Such parameters may, as previously described, be determined in such manner as to cause synchronized arrival of the distribution at each of the respective networked computing resources 106, 1106, according, for example, to any method(s) or process(es) described herein, using any suitable algorithm(s). Such determination may, for example, be based at least partly on a corresponding determined latency in the processing time related to such distribution(s) and/or portion(s), such as for example any or all of latencies A, B, X, Y, Z of FIG. 3, and/or any other relevant latencies, in the execution of signal exchanges between the router processor(s) 104, 1104 and each of the networked computing resources 106, 1106, or in the processing of other such signals by any of such devices. As synchronized arrival may be provided either for the beginning, end, or any other desired portion of a market data set and/or an information content data set, the length of time required to transmit all or any desired portion of market data set and/or an information content data set to one or more specific targeted recipient systems 106 can also be considered in determining corresponding timing parameters.

Moreover, such determination(s) may be made in real time, at the time of dissemination or release of the information, or made in advance using pre-stored timing parameters accessed when desired by router(s) 104.

At 212, market data sets and/or information content data sets are routed to the intended, or target, networked computing resources 106 according to timing parameters or sequence(s) determined or otherwise acquired at 210. Thereafter the information may be accessed, and interpreted, displayed, and/or otherwise processed, by the respective networked resources 106, 1106, as desired, with any desired subsequent signal communications and processing. As will be understood by those skilled in the relevant arts, once they have been made familiar with this disclosure, once the parameters of a desired distribution have been determined by router(s) 104, 1104, signals representing those parameters may be assembled, using known or specialized data processing techniques; formatted according to the Financial Information Exchange (FIX) protocol and/or any other desired protocol(s); and transmitted, written or otherwise communicated to the corresponding processor(s) 106, 1106 using known or specialized signal communications techniques, and interpreted in accordance with desired display, analysis, and/or other algorithms.

For example, continuing the example above, timing delays, or parameters X', Y', Z', one or all of which may be equal to zero or any other suitable time period, may be determined according the disclosure above and associated with a news release and routed to multiple tiers, or categories, of recipients, thus:

<date/time tier 1><delay XA><recipient 1A><source 102><content>
<date/time tier 1><delay XB><recipient 1B><source 102><content>
<date/time tier 1><delay XC><recipient 1C><source 102><content>
<date/time tier 2><delay XD><recipient 2A><source 102><content>
<date/time tier 2><delay XE><recipient 2B><source 102><content>
<date/time tier 2><delay XF><recipient 2C><source 102><content>
<date/time tier 3><delay XG><recipient 3A><source 102><content>
<date/time tier 3><delay XH><recipient 3B><source 102><content>
<date/time tier 3><delay XI><recipient 3C><source 102><content>
<date/time tier 3><delay XJ><recipient 3D><source 102><content>

Thereafter, routing processor(s) 104, 1104 can process the market data and/or information content routing segments by using timing parameters, e.g., date/time tiers 1, 2, 3, and/or delays XA, XB, XC, etc., to cause the corresponding transaction segments to be transmitted or otherwise provided to the target recipients 106 1A, 1B, 1C, etc. for display, interpretation, etc., according to a desired timing sequence, for simultaneous or otherwise-desired sequential release. In the example shown, three tiers of recipients are targeted; tier 1 recipients 1A, 1B, 1C, receive the market data and/or information content in synchronized fashion, according to delays XA, XB, XC, using a process 200 which commences at date/time the assigned for tier 1; recipients 2A, 2B, 2C receive the market data/information content in synchronized fashion, according to delays XD, XE, XF, using a process 200 which commences at the date/time associated with tier 2, etc.

Following routing of all or as many portions of routed distribution, transaction and/or processing segments as can be routed, routing processor(s) 104, 1104 can receive from corresponding target recipient processor(s) 106, 1106 data confirming or otherwise indicating receipt, and by accessing data records stored in associated memory(ies), can route confirmation receipt(s) to the requesting source(s) 102, 1102 (assuming the routed market data and/or information content data sets did not originate with router 104).

Reference is now made to FIG. 4, showing an example of a method 300 of determining timing parameters to be used in managing processing of data by multiple networked computing resources 106. In the embodiment shown, method 300 is an iterative method, and each loop of the method 300 is denoted as N. Method 300 is suitable for implementation using, for example, any of various embodiments of systems 100, 1000 and components thereof, including particularly router processor(s) 104, 1104 and data source(s) 1126.

At 302, each of a plurality of networked computing resources 106, 1106 is monitored, for example by router processor(s) 104, 1104, processor(s) 106, 1106, external processor(s) 1126, and/or various components or modules operated by or otherwise associated therewith, for latencies associated with receipt and/or execution of signal processing execution requests. This may be carried out, for example, by a monitoring module (e.g., an exchange RTL measurement module 1126b, such as for the financial system 1000) in the router processor(s) 104, 1104. Such monitoring may comprise, for example, time stamping outgoing requests for processing of data, and comparing times of receipt of confirmation(s) or results from processing to the corresponding time-stamped outgoing request. The difference in time between the outgoing request and the incoming receipt confirmation and/or data processing results can be defined as a data or signal processing latency, and stored in memory accessible by the router processor(s) 104, 1104. By timing differences between outgoing requests and incoming receipts, confirmations, and/or results, such latencies can be monitored on a continual, periodic, and/or other dynamic basis.

At 306, at least one timing parameter associated with latency(ies) observed in execution of signal processing requests provided to the monitored resources 106, 1106 by the routing processor(s) 104, 1104 is determined. As described herein, such timing parameter(s) may include, for example, latencies due to communication delay, such as transmission delays or other signal propagation delays, and/or processing delays, among others. Typically, corresponding timing parameter(s) are determined for each of the plurality of networked computing resources 106, 1106 to which a transaction order or other data processing request, or a portion thereof, is expected to be sent by routing processor(s) 104, 1104.

In various embodiments, such as in various forms of financial systems 1000, and depending upon the types of system(s) to be used and desired processing results, such timing parameters may be determined for one-way and/or round-trip communications between the routing processor(s) 1104 operated by or on behalf of a capital management entity and the exchange server 1106; that is, from generation of a multi-part transaction request by capital management entity's routing processor 1104 to the receipt of a response, such as confirmation of receipt of a part of a larger trading order and/or confirmation of execution of all or part of a requested trade, from the execution resource to which the processing request was directed. With reference to FIG. 1B, for example, and explained above, an RTL measurement may include latencies due any or all of transmission of signals within the capital management entity server 1104, processing of signals within the capital management entity 1104, transmission of signals between the capital management entity 1104 and a network 1110, transmission of signals within the network 1110, transmission of signals between the network 1110 and the targeted exchange server 1106, and processing of signals within the exchange server 1106; for both communications sent from the routing processor(s) 104, 1104 and responses (e.g., acknowledgement of communication, rejection of a trade request, confirmation of a trade request, etc.) sent from the exchange server 106, 1106. In such embodiments, the timing parameter(s) may be simply the total time for the round-trip communication, or a statistical or other mathematical function thereof.

For example, an exchange RTL measurement module 1126b, such as that associated with SOR 1104 shown in FIG. 1B, may determine a timing parameter as follows:

1) A time-stamp value T1 is associated by the processor(s) 1104 with a new communication M1 (e.g., a trade request) sent to an exchange server 1106.
2) A time-stamp value T2 is associated by the processor(s) 1104 with any response to the request M1 received from the exchange processor 1106 to which the request M1 was sent. This response can be any response such as acknowledgement, rejection, whole or partial fill, etc., and may depend on the nature of the request represented by M1.
3) The RTL associated with the request M1 is calculated as the difference between T2 and T1. In some embodiments, as noted above, RTL may be calculated as an average of the time (T2−T1) for a past number Z (e.g., 30) of processing requests routed to each of a plurality of targeted exchange processor(s) 1106.

At 308, timing parameter(s) associated with each networked computing resource 106 may be stored in timing data store(s) 214. As described herein, a timing data store 214, in some examples, may be a database or other data structure residing in a memory associated with or otherwise accessible by the router processor(s) 104. Timing parameter(s) stored in timing data store(s) 214 may be employed in processes such as those described above in connection with process block 210 of FIG. 2.

Timing parameter(s) determined by processor(s) 104, 1104 may for example represent rolling histogram(s) representing latencies associated with individual execution processors 106, 1106 and/or other components of system(s) 100, 1000.

Figure 5:
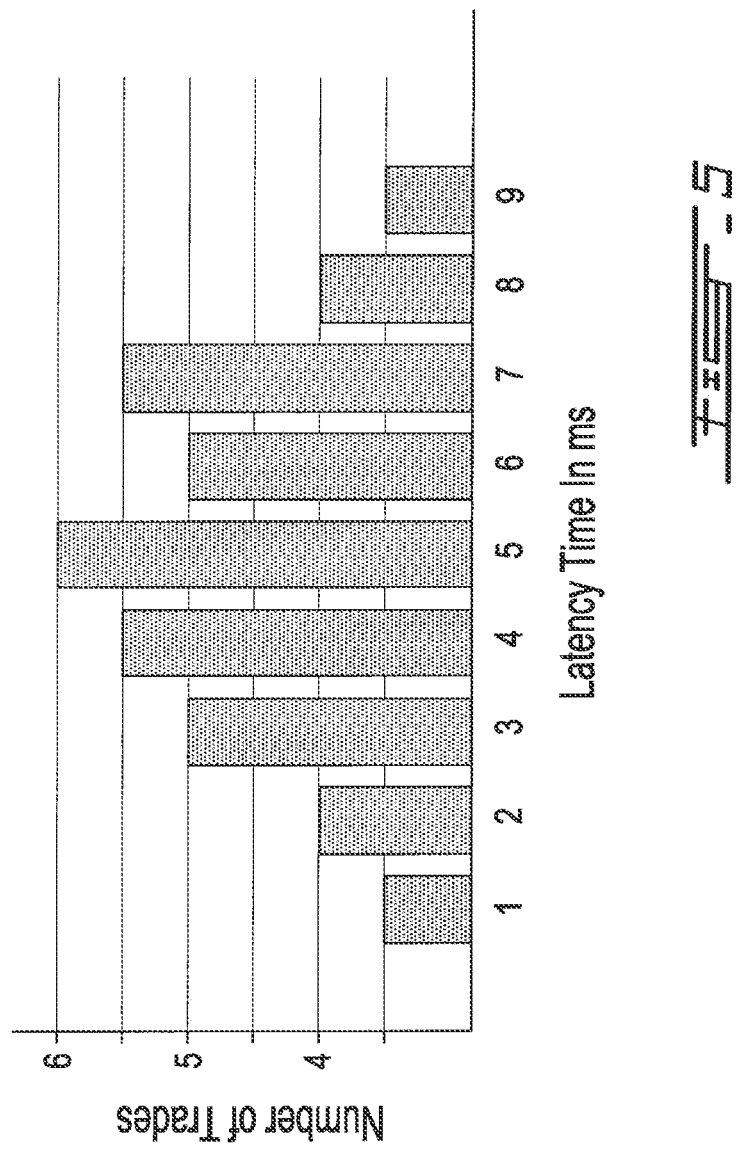
FIG. 5 shows an example histogram that may be used in an example method for managing processing of data by multiple networked computing resources in accordance with various aspects of the invention.

FIG. 5 shows an example of a histogram illustrating stored data representing processing latency time values associated communications and/or other processing associated with an execution processor 106, 1106 in a system 100, 1000. In the example shown, round-trip latency times (in ms) are stored for the most recent 30 transaction requests or other communications with a given execution server 106. Although the example shows 30 latency times being stored, the number of stored timing parameter(s) used in determining RTLs or other timing parameters may be greater or fewer, and may vary according to conditions such as the time of day, the season, etc. The results of calculations based on the stored latencies, and other related data, may also be stored in timing data store(s) 214. For example, in the example of FIG. 5, in addition to raw latency times, a rolling average or a rolling mode of the past 30 (or other suitable number) latency times associated with communications and/or other processing with or by each execution server 106 may also be calculated and stored in timing data store(s) 214.

As will be readily understood by those skilled in the relevant arts, further factors, including for example desired fix offsets or delays, or scaling factors associated with time of day, day of week, season of year, etc., known trading or other data processing patterns, economic conditions, etc., may be used at 210 in determining timing parameters.

Timing parameters determined at 210 can be used by routing processor(s) 104, 1104 to synchronize execution of processing requests originated by source(s) 102, 1102 and directed to processor(s) 106, 1106 by, for example, associating with such requests, or portions of them to be forwarded for execution by each of multiple processor(s) 106, 1106, data items useable by the processor(s) 104, 1104 to cause communication of the requests to the corresponding processor(s) 106, 1106 at desired absolute or relative times, to achieve desired synchronization of the arrival of the requests at the corresponding execution processor(s) 106, 1106. For example, by using data items configured to cause communication of one or more portions of the requests at given time(s) according to a clock associated with the processor(s) 104, 1104, the processor(s) 104, 1104 can cause the request(s) or request portion(s) to be communicated at a desired time of day, or in any desired relative order or sequence without regard to the actual time of day, but rather with respect to each other or some third index.

At 310, N is incremented by one, or other suitable value, or control is otherwise returned to 302 so that the process 302-308 continues. Optionally process 302-310 continues until a maximum desired number of iterations has been completed, or until all requests for transactions or other processing by orders have been processed (e.g., routed to execution processors 106, 1106), or until other suitable criteria has been met.

To aid operators and users of system(s) 100, 1000, or components thereof, understand or evaluate the effect of the disclosed method and system for causing processing of data by multiple networked computing resources, in some aspects, the present disclosure also provides various metrics (e.g., trading benchmarks, in the case of a financial system 1000) which may be determined by, and through the use of data generated from, any or all of the various components of a system 100, 1000.

Reference is now made to FIG. 6, which shows comparisons of results of transmission of multi-part trade execution requests to pluralities of networked computing resources, or execution processors 106, 1106 according to an example of the disclosed method and system, to results of conventionally-transmitted multi-part trade requests.

FIG. 6a shows results of execution of a multi-part transaction request using the disclosed methods and systems to obtain synchronized (in the illustrated case, substantially simultaneous) execution of the various parts or segments 624 of the multi-part transaction request (a sell order) by a plurality of exchange servers 106, 1106. In the example shown, a fill rate of 94% of an original aggregated order was achieved at the original offer price 630 of $4.21 (shown as "Level 1"). In a second round of transactions (which was filled in a single transaction, as shown at 626) the remaining volume was sold at a less-desired but still acceptable price 632 of $4.20 (shown as "Level 2"). The cost associated with the orders filled below the requested order price (i.e., those orders in Level 2) was $53,000 for the trader systems 1102 (e.g., client systems) and $10,049 for the capital management entity 1106.

In FIG. 6b, using prior-art trading methods and systems, an unsynchronized multi-part trade request (multi-exchange sell order) consisting of multiple, unsynchronized order segments 624' for the same overall transaction request resulted in an initial fill rate of 47% at the preferred order price 630 of $4.21 (shown as "Level 1"). A further 43% of the request was subsequently filled at the less-desirable price 632 of $4.20 (shown as "Level 2"), with the remainder being filled at a further reduced price 634 of $4.19 (shown as "Level 3").

Using methods and systems in accordance with the disclosure, a volume-weighted average sale price (VWAP) 636 of $4.2094/share was realized, as shown at 628. Using prior-art methods and systems, a VWAP 638 of $4.2038/share was realized.

As will be readily understood by those skilled in the relevant arts, systems 100, 1000 can comprise devices or components suitable for providing a wide variety of further metrics and functionalities. For example, reference is now made to FIG. 7, which illustrates two examples of the provision by a routing processor 104, 1104 or other processor of a benchmark comparison relative to a market average price provided by, for example, a market news service or other market data source 1126v. At 646, performance of a system 100, 1000 in synchronized processing of a multi-part transaction request in accordance with the invention is compared to a market performance indicator "Average Price Benchmark." Such average price benchmark, or other benchmark or metric factor, can be obtained from, for example, any or all of components 1126, 1106, etc. At 644, performance of a system 100, 1000 in un-synchronized processing of a multi-part transaction request in accordance with prior art methods is compared to the same market performance indicator "Average Price Benchmark." Comparison of comparisons 646, 644 indicates that processing of transactions in accordance with the invention provides better results for a seller of financial interests. As will be understood by those skilled in the relevant arts, a wide variety of benchmarks may be used in assessing performance of systems and methods according to the invention. Such benchmarks may be determined at least partially by the nature of the system 100, 1000 used, and the types of transactions or other execution requests processed by such system.

In the embodiment shown in FIG. 1B, source(s) 1126 of data useable by processor(s) 104 in preparing financial transaction or other data processing execution requests includes a plurality of modules 1126a-g useful in preparing a multi-part execution request. In the example shown, modules 1126a-g include market data processing module 1126a, exchange round-trip latency measurement module 1126b, adaptive exchange round-trip latency (RTL) learning & compensation logic module 1126c, smart sweeping share allocation logic module 1126d, smart posting logic module 1126e, regional & national exchange access logic module 1126f, and aggressiveness management module 1126g.

Market data processing module 1126a receives and processes market data, which may be the same as or different from data provided through exchange market data module 1126v of the exchange server 1106. Sources of such data may be internal to the system 1104, or external, as needed or desired, and may include any suitable private or publicly-available sources of data useful in preparing execution requests, and particularly such requests that are useful in dividing or otherwise preparing a transaction order: information provided can, for example, include the numbers or quantities and/or prices available on any particular exchanges; historical trading volumes or prices; current and historical depth of market(s) or liquidity; reserve sizes; absolute, relative, and/or average price spreads; and stock- or interest-specific heuristics; and/or trends in any or all thereof.

Exchange RTL measurement module 1126b determines timing parameters for use in synchronizing execution of multi-part trade or other data processing requests by pluralities of exchange server 1106s, as for example explained herein, using statically-defined latency data representing time(s) elapsed between sending of requests or other data to, and receipt of confirmation or execution results from, individual execution processor(s) 106, 1106.

Adaptive Exchange RTL measurement module 1126c determines timing parameters for use in synchronizing execution of multi-part trade or other data processing requests by pluralities of exchange server 1106s, as for example explained herein, using dynamically-defined ("rolling") latency data representing times elapsed between sending of multiple processing requests, or other data, to, and receipt of confirmation or execution results from, individual execution processor(s) 106, 1106. Histograms and other data models and/or structures representing such rolling data may be used by module(s) 1126c in determining timing parameters according to such processes.

Smart sweeping share allocation logic module 1126d includes a statistical model for strategically oversizing transaction requests, and/or associating reserve quantity(ies) with publicly-posted orders, based on historically observed market data. This module 1126d determines, for example, a suitable oversizing (i.e., over-ordering on a trade request) to be incorporated in an open order, taking into consideration predicted hidden reserve quantity(ies) in an exchange server 1106, based on statistical data about the hidden reserve available in that exchange server 1106 over a given period or under other specified conditions (e.g., the past 30 trade requests). Based on such predicted hidden market reserves, a suitably-sized hidden reserve can be determined, and associated with a transaction order, to result in a strategic oversizing of the publicly-viewable order and help to ensure that an actual desired trading volume is realized.

Smart posting logic module 1126e includes a statistical model for determining the probability of fills (i.e., percentage satisfaction of a trade request) expected to be realized in trade requests routed to individual exchange servers 1106. Such statistical models may for example include historical fill data realized on such individual exchanges over a given period (e.g., the past 30 trade requests, last month, previous 12 months, etc.). A smart posting logic module 1126e may take into consideration factors including, for example, the depth of the top of book at each exchange server 1106, the volatility level across exchange servers 1106 and the mean latency time to execution of a trade request, among other factors.

Regional & national exchange access logic module 1126f provides information about how a trade request should be routed to an exchange server 1106, depending on whether the exchange server 1106 is regional or national. Internally- and/or externally-stored data related to suitable protocol(s) to be employed, regulations to be observed, etc., may be employed in providing such data. Such data may be used, for example, in ensuring that trade or other processing requests forwarded to external resources 106, 1106 by routing processor(s) 104, 1104 are suitably formatted, in view of the resource(s) 106, 1106 to which the request(s) are provided, and in ensuring that such request(s) comply with all applicable legal standards.

Aggressiveness management logic module 1126g includes a probability model for determining the probability of a fill percentage for individual exchange servers 1106, and modifying execution requests routed to such servers accordingly. Such a module 1126g may take into consideration factors such as, for example, the fill rate at each exchange server 1106, the depth of book at each exchange server 1106, and the volatility levels across exchange servers 1106, among other factors.

In some embodiments, one or more modules may be located at a recipient's systems to monitor and/or ensure compliance. The purpose of the one or more modules may be to help reduce the ability of a recipient to "trick" a system regarding the arrival of packets transmitted from a source system. For example, a recipient who is actually "near", from a networking perspective, to a source, such as an exchange, may seek to delay pings, acknowledgements, and/or other timing messages to/from the source. The source may be led to inaccurately believe that the recipient is "far", from a networking perspective, and may develop/apply sending rules accordingly.

The one or more modules to monitor and/or ensure compliance may, for example, be configured so that information, such as market data, flows through the one or more modules to ensure compliance. In further embodiments, the one or more modules may include configurations for encrypting the data or receiving encrypting the data, which may prevent the recipient from directly accessing the data stream and effectively bypassing the one or more modules. The one or more modules may be configured to then de-crypt the data once it has been received.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A system for coordinating transmission of one or more data sets comprising market data to a plurality of subscribers, the system comprising at least one processor configured to:
   parse source instructions to prepare signals representing at least a portion of a data process to a plurality of networked computing resources, the data process including one or more data sets comprising information content and one or more networking parameters for communicating the information content from one or more computer systems associated with one or more of the subscribers associated with respective networked computing resources;
   associate, with the signals representing at least a portion of the data process, at least one timing parameter determined at least partly using one or more latencies associated with execution of signal exchanges associated with at least one of the networked computing resources; and
   route, in accordance with a timing sequence, the signals representing at least a portion of the data process to a networked computing resource,
   wherein each of the plurality of subscribers is associated with a tier, and wherein the timing sequence is based on at least one associated timing parameter so as to cause prioritized arrival or processing of at least a portion of the data process at networked computer resources based on the tier associated with respective subscribers.

2. The system of claim 1, wherein the at least one timing parameter is determined based at least partly on at least one of:
   dynamically-monitored latency in execution of signal processing requests routed to at least one of the plurality of networked computing resources;
   statistical latency in execution of signal processing requests routed to the at least one of the plurality of networked computing resources;
   historical latency in execution of signal processing requests routed to the at least one of the plurality of networked computing resources; and
   predictive latency in execution of signal processing requests routed to the at least one of the plurality of networked execution processors.

3. The system of claim 1, wherein the information content includes market data.

4. The system of claim 1, wherein each of the plurality of subscribers is associated with a tier of a plurality of tiers.

5. The system of claim 1, wherein each of the plurality of subscribers is associated with a single tier.

6. The system of claim 1, wherein the timing sequence is determined such that the prioritized arrival or processing of at least a portion of the data process is simultaneous; or is according to: a non-simultaneous sequence, or a determined relative timing.

7. The system of claim 1, wherein the timing sequence is determined based on the at least one associated timing parameter so as to cause prioritized arrival or processing of: the start of the one or more data sets, the end of the one or more data sets, or a desired portion of the one or more data sets.

8. The system of claim 1, wherein the source instructions are based on parameters defining at least one of:
   a time at which the signals representing at least a portion of the data process to a networked computer resource are routed; and
   a frequency at which the signals representing at least a portion of the data process to a networked computer resource are routed.

9. The system of claim 1, wherein the at least one processor is configured to receive signals from at least one of the plurality of networked computing resources to detect whether the at least one of the plurality of networked computing resources is manipulating network latency data.

10. The system of claim 1, wherein the at least one timing parameter is determined based at least partly on at least one of: communication delay, processing delay, or a latency probability model.

11. The system of claim 1, wherein the information content is associated with financial interests including at least one of commodities, currency interests, equity interests, non-equity interests, or derivatives thereof.

12. A method performed by at least one data processor executing machine-interpretable instructions configured to cause the at least one processor to:
   parse source instructions to prepare signals representing at least a portion of a data process to a plurality of networked computing resources, the data process including one or more data sets comprising information content and one or more networking parameters for communicating the information content from one or more computer systems associated with one or more of the subscribers associated with respective networked computing resources;
   associate, with the signals representing at least a portion of the data process, at least one timing parameter determined at least partly using one or more latencies associated with execution of signal exchanges associated with at least one of the networked computing resources; and route, in accordance with a timing sequence, the signals representing at least a portion of the data process to a networked computing resource, wherein each of the plurality of subscribers is associated with a tier, and wherein the timing sequence is based on at least one associated timing parameter so as to cause prioritized arrival or processing of at least a portion of the data process at networked computer resources based on the tier associated with respective subscribers.

13. The method of claim 12, wherein the at least one timing parameter is determined based at least partly on at least one of:

dynamically-monitored latency in execution of signal processing requests routed to at least one of the plurality of networked computing resources;

statistical latency in execution of signal processing requests routed to the at least one of the plurality of networked computing resources;

historical latency in execution of signal processing requests routed to the at least one of the plurality of networked computing resources; and predictive latency in execution of signal processing requests routed to the at least one of the plurality of networked execution processors.

14. The method of claim 12, wherein the information content includes market data.

15. The method of claim 12, wherein each of the plurality of subscribers is associated with a tier of a plurality of tiers.

16. The method of claim 12, wherein the timing sequence is determined such that the prioritized arrival or processing of at least a portion of the data process is simultaneous; or is according to: a non-simultaneous sequence, or a determined relative timing.

17. The method of claim 12, wherein the timing sequence is determined based on the at least one associated timing parameter so as to cause prioritized arrival or processing of: the start of the one or more data sets, the end of the one or more data sets, or a desired portion of the one or more data sets.

18. The method of claim 12, wherein the source instructions are based on parameters defining at least one of:

a time at which the signals representing at least a portion of the data process to a networked computer resource are routed; and a frequency at which the signals representing at least a portion of the data process to a networked computer resource are routed.

19. The method of claim 12, wherein the information content is associated with financial interests including at least one of commodities, currency interests, equity interests, non-equity interests, or derivatives thereof.

20. A computer-readable medium or media comprising non-transient machine-readable programming structures configured to cause at least one processor to:

parse source instructions to prepare signals representing at least a portion of a data process to a plurality of networked computing resources, the data process including one or more data sets comprising information content and one or more networking parameters for communicating the information content from one or more computer systems associated with one or more of the subscribers associated with respective networked computing resources;

associate, with the signals representing at least a portion of the data process, at least one timing parameter determined at least partly using one or more latencies associated with execution of signal exchanges associated with at least one of the networked computing resources; and route, in accordance with a timing sequence, the signals representing at least a portion of the data process to a networked computing resource, wherein each of the plurality of subscribers is associated with a tier, and wherein the timing sequence is based on at least one associated timing parameter so as to cause prioritized arrival or processing of at least a portion of the data process at networked computer resources based on the tier associated with respective subscribers.

* * * * *